United States Patent
Kobori et al.

(10) Patent No.: US 10,691,110 B2
(45) Date of Patent: Jun. 23, 2020

(54) TRANSFER APPARATUS

(71) Applicant: SONY CORPORATION, Tokyo (JP)

(72) Inventors: Yuji Kobori, Chiba (JP); Ibuki Tamura, Chiba (JP)

(73) Assignee: SONY CORPORATION, Tokyo (JP)

( * ) Notice: Subject to any disclaimer, the term of this patent is extended or adjusted under 35 U.S.C. 154(b) by 236 days.

(21) Appl. No.: 15/328,721

(22) PCT Filed: Jun. 12, 2015

(86) PCT No.: PCT/JP2015/002962
§ 371 (c)(1),
(2) Date: Jan. 24, 2017

(87) PCT Pub. No.: WO2016/021100
PCT Pub. Date: Feb. 11, 2016

(65) Prior Publication Data
US 2017/0212508 A1 Jul. 27, 2017

(30) Foreign Application Priority Data
Aug. 8, 2014 (JP) .................. 2014-162604

(51) Int. Cl.
G05B 19/41 (2006.01)
G05B 19/418 (2006.01)
(Continued)

(52) U.S. Cl.
CPC ........ *G05B 19/41815* (2013.01); *B23P 19/04* (2013.01); *B23P 21/00* (2013.01);
(Continued)

(58) Field of Classification Search
CPC .... G05B 19/41815; G05B 2219/39106; G05B 2219/45063; B23P 19/04; B23P 21/00; B25J 9/0096; B25J 15/08; G11B 7/268
See application file for complete search history.

(56) References Cited

U.S. PATENT DOCUMENTS 3,868,755 A * 3/1975 Tongurian ............... B23P 19/04
29/252
7,987,018 B2 * 7/2011 Polyakov ............. G11B 17/225
369/30.48
(Continued)

FOREIGN PATENT DOCUMENTS

CN 103366776 A 10/2013
JP 59-224278 A 12/1984
(Continued)

OTHER PUBLICATIONS

Office Action for CN Patent Application No. 201580040610.7, dated Jun. 29, 2018, 04 pages of Office Action and 06 pages of English Translation.

*Primary Examiner* — Zakaria Elahmadi
(74) *Attorney, Agent, or Firm* — Chip Law Group

(57) ABSTRACT

[Object] To provide a transfer apparatus that can shorten a cycle time and improve processing capability. [Solving Means] A transfer apparatus according to an embodiment of the present technology includes a work table, a transfer robot, and at least one mounting unit. The work table supports at least one electronic device. The transfer robot transfers a work to be mounted to the electronic device. The mounting unit includes a support and a driving unit. The support supports the work transferred by the transfer robot. The driving unit transfers the support toward the electronic device on the work table.

9 Claims, 22 Drawing Sheets

(51) Int. Cl.
  *B23P 19/04* (2006.01)
  *B23P 21/00* (2006.01)
  *B25J 9/00* (2006.01)
  *B25J 15/08* (2006.01)
  *G11B 7/26* (2006.01)

(52) U.S. Cl.
  CPC ............ *B25J 9/0096* (2013.01); *B25J 15/08* (2013.01); *G11B 7/268* (2013.01); *G05B 2219/39106* (2013.01); *G05B 2219/45063* (2013.01)

(56) References Cited

U.S. PATENT DOCUMENTS

| | | | | |
|---|---|---|---|---|
| 8,116,079 B2* | 2/2012 | Merrow | ............... | G11B 33/142 165/121 |
| 9,908,236 B2* | 3/2018 | Minami | ................... | B25J 9/042 |
| 2006/0269384 A1* | 11/2006 | Kiaie | ..................... | B25J 9/0096 414/222.02 |
| 2009/0255632 A1* | 10/2009 | Park | ....................... | B32B 39/00 156/353 |
| 2011/0047788 A1* | 3/2011 | Immekus | ............... | B23P 21/00 29/729 |
| 2011/0193253 A1* | 8/2011 | Polk | ..................... | B29C 31/006 264/40.7 |
| 2012/0050903 A1* | 3/2012 | Campbell | ............ | G11B 33/128 360/31 |
| 2013/0197696 A1* | 8/2013 | Nammoto | ............. | B25J 9/1612 700/259 |
| 2013/0331989 A1* | 12/2013 | Umeno | .................. | B25J 9/0096 700/258 |
| 2014/0277714 A1* | 9/2014 | Izumi | ..................... | B25J 9/0084 700/248 |
| 2014/0350713 A1* | 11/2014 | Kimura | ............. | H01L 21/67265 700/213 |
| 2015/0104283 A1* | 4/2015 | Nogami | ................. | B25J 9/0087 414/730 |
| 2015/0328771 A1* | 11/2015 | Yuelai | .................... | B25J 13/085 414/730 |
| 2016/0288280 A1* | 10/2016 | Lin | ......................... | B23P 21/00 |
| 2018/0215035 A1* | 8/2018 | Ono | ....................... | B25J 9/0087 |

FOREIGN PATENT DOCUMENTS

| | | |
|---|---|---|
| JP | 06-114655 A | 4/1994 |
| JP | 2001-105364 A | 4/2001 |
| JP | 2001-194372 A | 7/2001 |
| JP | 2004-058212 A | 2/2004 |
| JP | 2005-310194 A | 11/2005 |
| JP | 2010-201593 A | 9/2010 |
| JP | 2010-234456 A | 10/2010 |
| JP | 2013-158850 A | 8/2013 |
| JP | 2014-131821 A | 7/2014 |
| JP | 5682721 B1 | 3/2015 |
| JP | 5696806 B1 | 4/2015 |
| WO | 2008/087702 A1 | 7/2008 |

* cited by examiner

TRANSFER APPARATUS

CROSS REFERENCE TO RELATED APPLICATIONS

This application is a U.S. National Phase of International Patent Application No. PCT/JP2015/002962 filed on Jun. 12, 2015, which claims priority benefit of Japanese Patent Application No. JP 2014-162604 filed in the Japan Patent Office on Aug. 8, 2014. Each of the above-referenced applications is hereby incorporated herein by reference in its entirety.

TECHNICAL FIELD

The present technology relates to a transfer apparatus that is used for assembling or inspecting an electronic device, for example.

BACKGROUND ART

For example, in a transfer process of a work in a manufacturing line of an electronic device and an electronic component, a variety of industrial robots are used. This kind of robots are requested to have an improved processing capability by shortening transfer working hours.

For example, Patent Literature 1 describes a pitch conversion mechanism in a word transfer system including a robot that transfers magnetic discs accommodated in a buffer to a cleaning apparatus that receives two magnetic discs transferred by the robot, and converting a pitch of the two magnetic discs into a predetermined pitch to feed them to the cleaning apparatus.

Patent Literature 2 discloses an information recording and reproducing apparatus including a cartridge where a plurality of optical disc are loaded, a spindle that rotates the optical discs, and a first robot arm and a second robot arm that transfers them between the optical disc cartridge and the spindle.

CITATION LIST

Patent Literature

Patent Literature 1: Japanese Patent Application Laid-open No. 2001-105364
Patent Literature 2: Japanese Patent Application Laid-open No. 2005-310194

DISCLOSURE OF INVENTION

Technical Problem

For example, when an industrial robot is used in an assembling process of an electronic device or an inspection process that evaluates a function of the electronic device, high transfer accuracy is requested for mounting an assembling component or an inspection component (hereinafter may be simply referred to as a "work") to a device. Accordingly, there is a limitation to shorten the time for mounting the work to the device, and it is very difficult to improve a processing capability of a whole apparatus. In particular, the above-described problem is prominent in the transfer system that mounts the work to a plurality of the devices by one robot.

In view of the above-described circumstances, an object of the present technology is to provide a transfer apparatus that can shorten a cycle time and improve the processing capability.

Solution to Problem

A transfer apparatus according to an embodiment of the present technology includes a work table, a transfer robot, and at least one mounting unit.

The work table supports at least one electronic device.

The transfer robot transfers a work to be mounted to the electronic device.

The mounting unit includes a support and a driving unit. The support supports the work transferred by the transfer robot. The driving unit transfers the support toward the electronic device on the work table.

The transfer apparatus is configured such that the transfer operation of the work to the device is shared by the transfer robot and the mounting unit. In this manner, it is possible to ensure highly precise inclusion to the device and to shorten the cycle time. The operation and effect becomes especially prominent when the plurality of mounting units are disposed corresponding to the plurality of devices on the work table.

The support may include a receptor unit and a gripping unit. The receptor unit is configured to be capable of receiving the work transferred by the transfer robot. The gripping unit is configured to be capable of gripping the work received by the receptor unit.

In this manner, it is possible to supply from the transfer robot to the mounting unit by falling, and to shorten the cycle time.

The receptor unit may include a positioning mechanism that positions the work at a predetermined posture. This allows the clamp position of the work to be prevented from deviating.

For example, when the work is a disc-shaped recording medium, the gripping unit grips a predetermined position on a recording surface of the disc-shaped recording medium and an opposite surface thereof. This allows the work to be held stably.

The transfer apparatus may be configured as an inspection apparatus. In this case, the work is a recording medium that stores information that the electronic device is readable.

On the other hand, the mounting unit is configured to be capable of reciprocating straightly the support between a first position and a second position. The first position is where the work is delivered between the driving unit and the transfer robot, and the second position is where the work is delivered between the driving unit and the electronic device.

By the above configuration, it is possible to insert the recording medium into the electronic device and taken out the recording medium from the electronic device appropriately by the mounting unit.

The electronic device may include a plurality of electronic devices disposed on the work table. The mounting unit includes a plurality of mounting units disposed corresponding to the plurality of electronic devices.

In this manner, while one mounting unit mounts the work to one electronic device, the transfer robot can transfer and receive the work to/from other mounting unit, thereby improving the processing capability.

The plurality of mounting units may be disposed at equal angle spaces around the work table. In this case, the work table is configured of an index table rotatable at equal angle spaces.

In this manner, the plurality of mounting units are used to mount the works to the electronic device at each rotation position of the work table. The works mounted to the electronic device at each rotation position may be different or the same.

The transfer robot may be disposed at a center part of the work table being in non-contact with the work table.

This allows the transfer robots to be positioned at equal distances to each mounting unit.

The transfer robot may include a hand unit including a first clamp apparatus that is capable of gripping the electronic device, and a second clamp apparatus that is capable of gripping the work.

This allow the electronic device and the work to be transferred by a common transfer robot.

Advantageous Effects of Invention

As described above, according to the present technology, the cycle time can be shortened, and the processing capability can be improved.

It should be noted that the effect described here is not necessarily limitative and may be any effect described in the present disclosure.

MODE(S) FOR CARRYING OUT THE INVENTION

Hereinafter, an embodiment of the present disclosure will be described with reference to the drawings.

Figure 1:
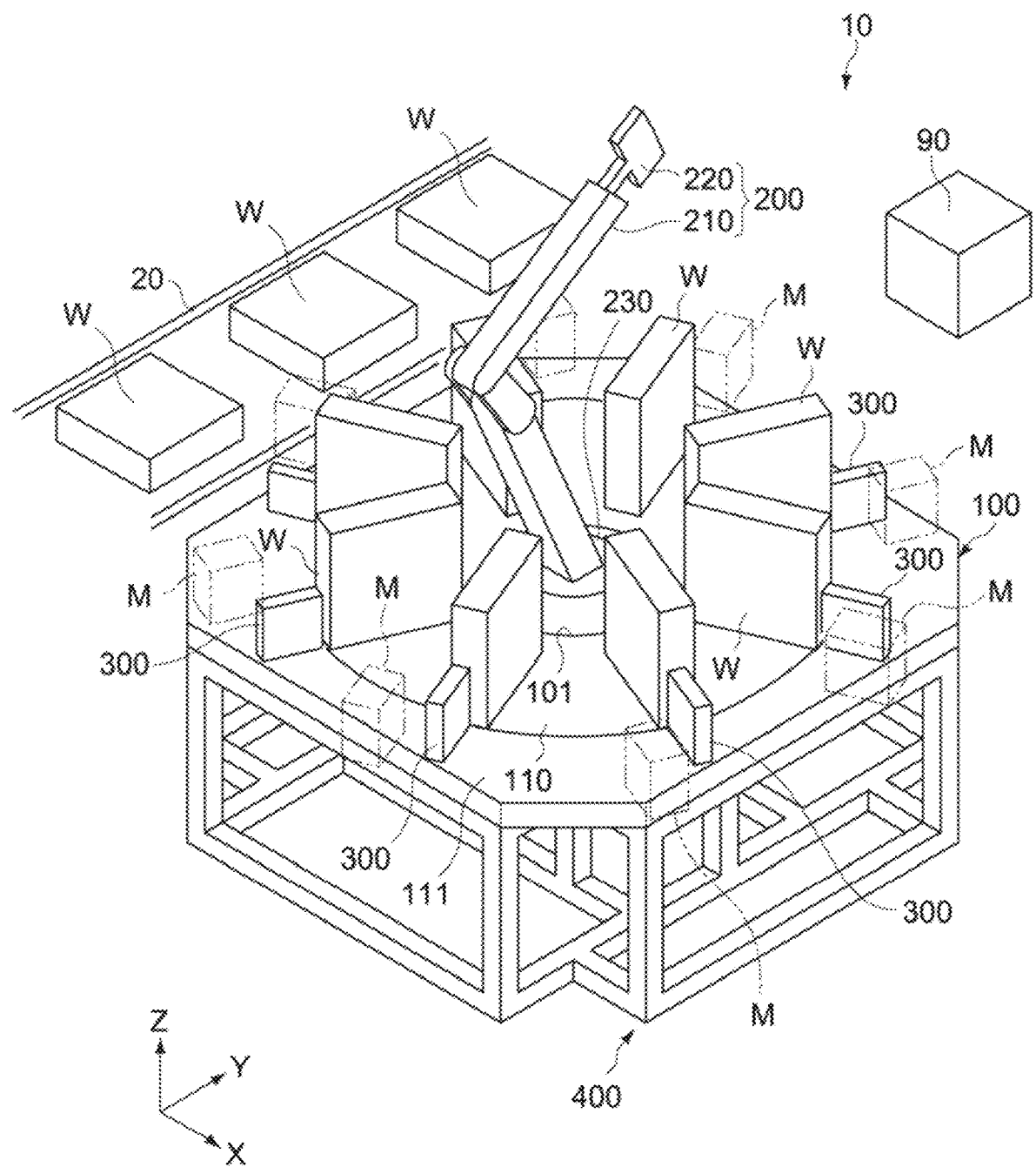
FIG. 1 is a schematic perspective view of an inspection apparatus according to an embodiment of the present technology.

FIG. 1 is a schematic perspective view of an inspection apparatus 10 according to an embodiment of the present technology. The inspection apparatus 10 is configured as an industrial robot used in a product inspection process in a manufacturing line of electronic device W.

[Overview of Inspection Apparatus]

The inspection apparatus 10 is disposed adjacent to a transfer line 20 of the electronic devices W. The inspection apparatus 10 includes a work table 100, a transfer robot 200 that transfers the electronic devices W between the transfer line 20 and the work table 100, and a plurality of mounting units 300 that attach and detach optical discs (disc recording media) for inspection as works to the electronic devices placed on the work table 100.

As a center part of the work table 100, an opening 101 for accommodating the transfer robot 200 is disposed. The work table 100 is configured of a rotary index table as described later, and includes a rotary table unit 110 at an inner periphery where the opening 101 is formed.

The plurality of mounting units 300 are disposed at equal angle spaces on a fixed table unit 111 positioned at an outer periphery of the rotary table unit 110, mount the optical discs for inspection to the electronic devices W facing to the rotary table unit 110, or drawing out the optical discs from the electronic devices W.

The transfer robot 200 transfers the electronic devices W one by one between the transfer line 20 and the work table 100. The transfer robot 200 sequentially transfers the electronic devices W at predetermined positions of the rotary table unit 110 from the transfer line 20, and sequentially transfers the inspected electronic devices W from the rotary table unit 110 to the transfer line 20. Furthermore, the transfer robot 200 transfers the optical discs for inspection between a plurality of disc stockers M disposed at equal angle spaces around the rotary table unit 110 and a plurality of mounting units 300, as described later.

Actions of the transfer robot 200 and the plurality of mounting units 300, a rotation action of the rotary table unit 110, and start-up and functional evaluation of each electronic device W executed by using the optical disc for inspection are controlled by a controller 90. The controller 90 is typically configured of a computer. The controller 90 may control the transfer robot 200 so that transfer positions of the electronic devices W are different depending on the evaluation results of the electronic devices W. Also, the controller 90 may be configured to control the action of the transfer line 20. The controller 90 may be configured as a part of the inspection apparatus 10, or may be configured as a control apparatus separated from the inspection apparatus 10.

The inspection apparatus 10 performs the functional evaluation of the electronic devices W using the optical disc for inspection. To the electronic devices W, a variety of electronic devices where an optical disc drives are built-in are applicable. The number of the optical discs used for inspection may be single or plural, which can be determined depending on an object of the inspection.

In this embodiment, the plurality of optical discs having mutually different recording formats are used. To the plurality of disc stockers M, a plural types of optical discs are accommodated. The inspection apparatus 10 inspects whether or not the respective electronic devices W can read out data stored on the plural types of the optical discs correctly.

The types and shapes of the electronic devices W are not especially limited. In this embodiment, optical disc apparatuses each having a substantially rectangular parallelepiped shape in a planar view are used. The electronic devices W are placed in a lying attitude on the transfer line 20, and placed in a standing attitude on the work table 100, as shown in FIG. 1. Without limiting thereto, the attitudes of the electronic device W can be set in accordance with the configurations of the transfer apparatus and the inspection apparatus, as appropriate.

The inspection apparatus 10 includes a stand unit 400 that supports commonly the work table 100 and the transfer robot 200. The stand unit 400 includes a first stand 41 for supporting the transfer robot 200, and a second stand 42 for supporting the work table 100.

[Stand Unit]

Figure 2:
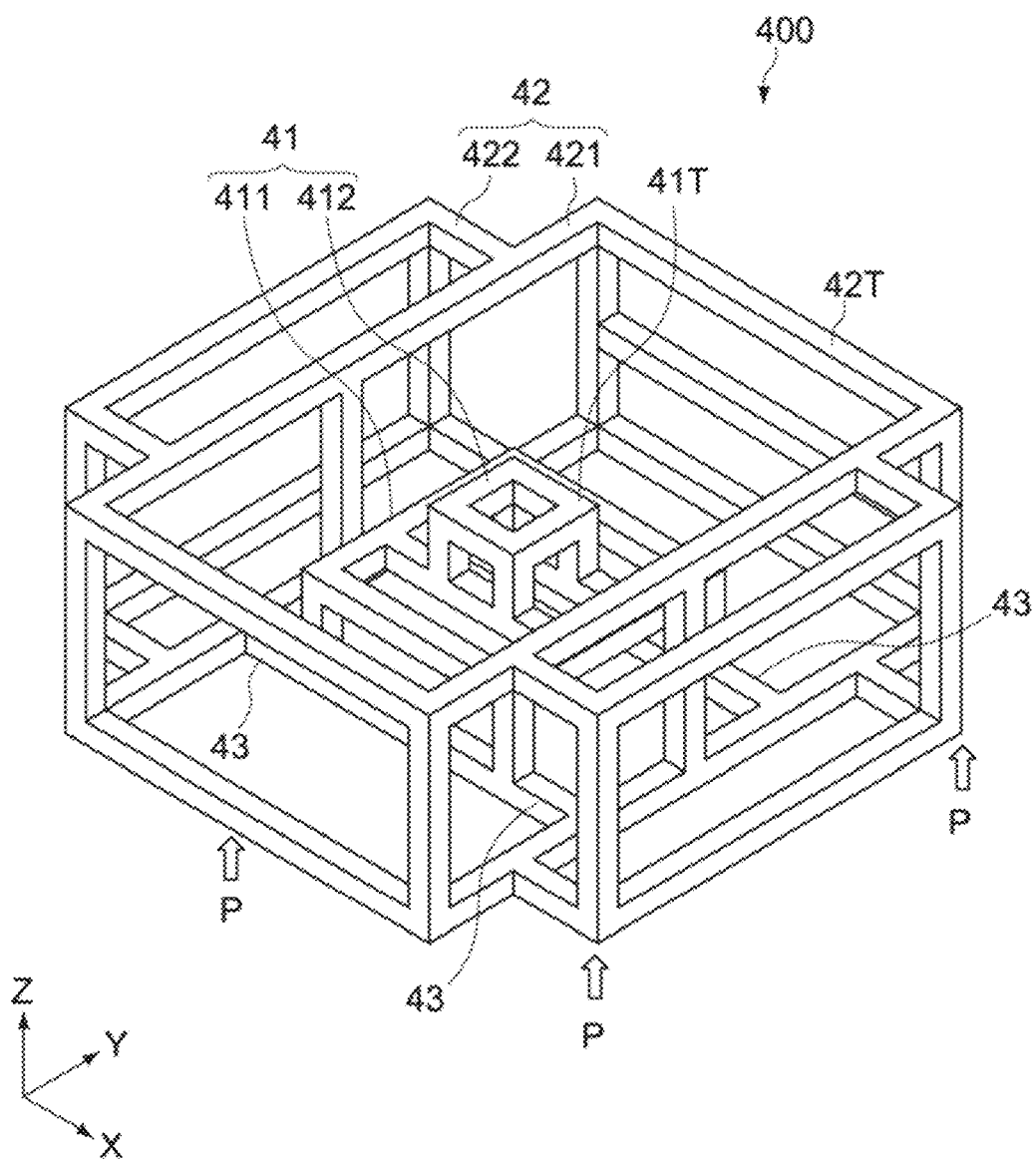
FIG. 2 is a schematic perspective view showing an overall of a stand unit in the inspection apparatus.
Figure 3:
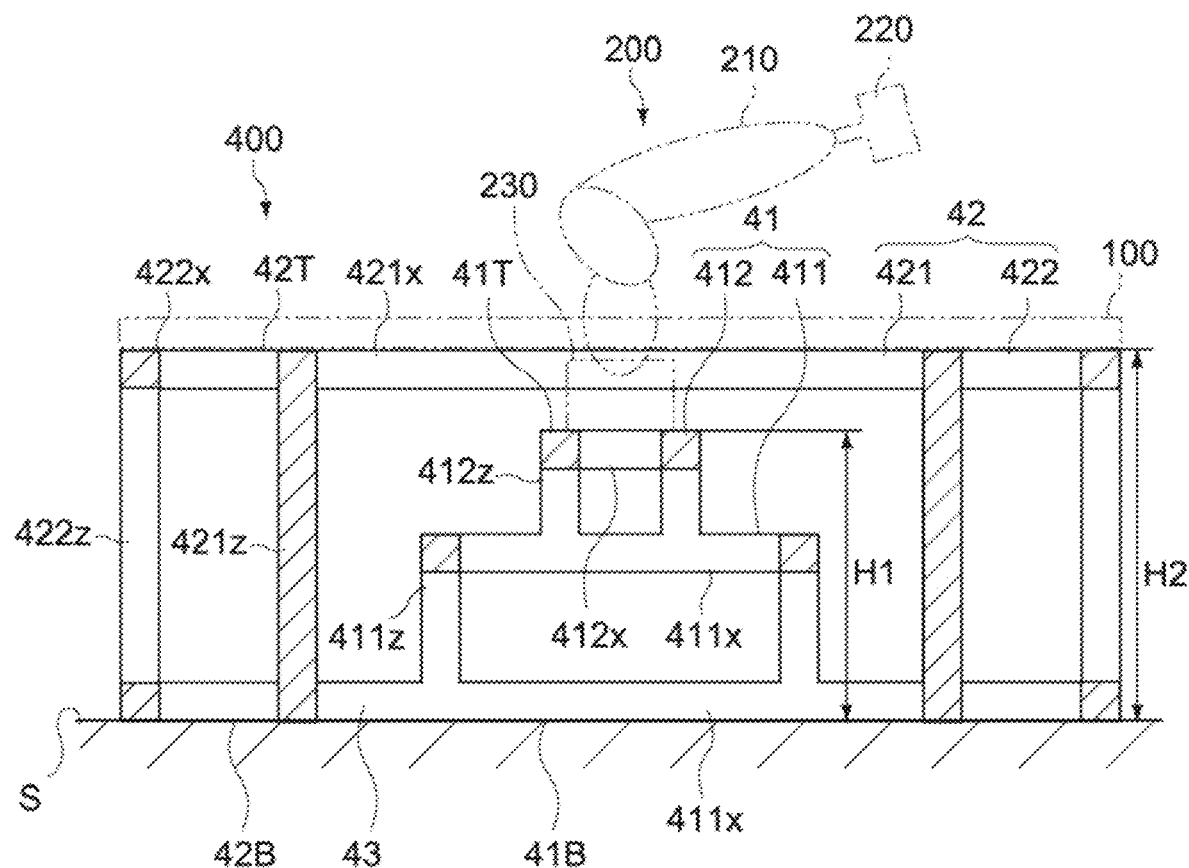
FIG. 3 is a cross-sectional view viewed from a front direction of the stand unit.
Figure 4:
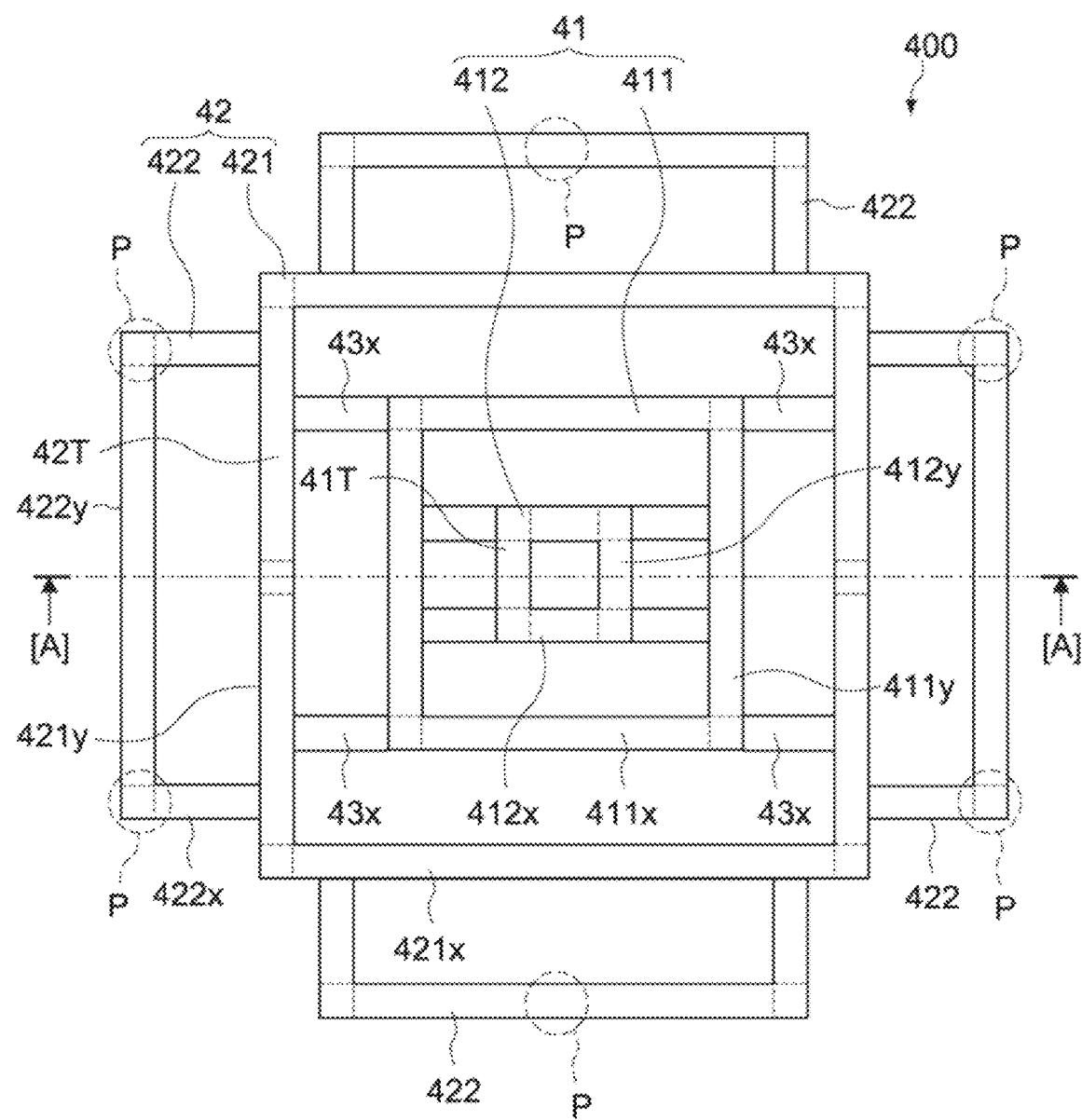
FIG. 4 is a plan view of the stand unit.

FIG. 2 is a schematic perspective view showing an overall of the stand unit 200, FIG. 3 is a cross-sectional view viewed from a front direction of the stand unit 400 (in an [A]-[A] line cross-sectional view in FIG. 4), and FIG. 4 is a plan view of the stand unit 400. In each drawing, X axis and Y axis directions show mutually orthogonal horizontal directions, and a Z axis direction shows a height direction orthogonal to them.

The stand unit 400 is configured of a three-dimensional metal frame having a framework structure. The height of the stand unit 400 is set so that the transfer robot 200 and the work table 100 can be located at predetermined heights H1, H2 (see FIG. 3) from a floor S.

The stand unit 400 includes a first stand 41, a second stand 42, and a coupling frame 43.

(First Stand)

The first stand 41 is configured of a three-dimensional metal framework. The first stand 41 includes a first top end 41T supporting the transfer robot 200, and a first bottom end 41B located on the floor S.

Furthermore, the first stand 41 has a combined structure of a first base frame 411 and a second base frame 412.

The first base frame 411 has a frame structure including the first bottom end 41B. Specifically, the first base frame 411 includes a plurality of axis members 411$x$ extending in an X axis direction, a plurality of axis members 411$y$ extending in a Y axis direction, and plurality of axis members 411$z$ extending in a Z axis direction, and is configured of a three-dimensional framework where the plurality of axis members are mutually combined. The first bottom end 41B is configured of a frame surface parallel to the floor S.

The second base frame 412 has a frame structure including the first top end 41T. Specifically, the second base frame 412 includes a plurality of axis members 412$x$ extending in an X axis direction, a plurality of axis members 412$y$ extending in a Y axis direction, and plurality of axis members 412$z$ extending in a Z axis direction, and is configured of a three-dimensional framework where the plurality of axis members are mutually combined. The first top end 41T is configured of a frame surface parallel to the floor S. [0034] A plurality of axis members 412$x$, 412$y$, 412$z$ configuring the second base frame 412 have axis lengths shorter than a plurality of axis members 411$x$, 411$y$, 411$z$ configuring the first base frame 411. Thus configured second base frame 412 is located on an upper center of the first base frame 411.

The first base frame 411 and the second base frame 412 are coupled or integrated by bolt fastening or welding the plurality of axis members. The length, the cross-sectional shape, the width or the like of each axis member is not especially limited, and is designed to have predetermined stiffness and strength for stably the transfer robot 200.

The transfer robot 200 is located at the top end 41T of the first stand 41 so as to protrude upward from the opening 101 of the work table 100. There is a certain space between the opening 101 and the transfer robot 200, and the transfer robot 200 is operated being in non-contact with the work table 100.

In this embodiment, the second base frame 412 is configured to be attachable and detachable to/from the first base frame 411. In this case, the second base frame 412 is detached from the first base frame 411 together with the transfer robot 200. In this manner, the configuration of the second base frame 412 may be optimized depending on the types of the transfer robot 200.

(Second Stand)

The second stand 42 is configured of a three-dimensional metal frame, similar to the first stand 41. The second stand 42 includes a second top end 42T supporting the transfer robot 200, and a second bottom end 42B located on the floor S.

The second stand 42 has a framework structure including a second base frame 42B and a second top end 42T, and is configured to surround the first stand 41. The second bottom end 42B and the second top end 42T each is configured of a frame surface parallel to the floor S. In this embodiment, the second stand 42 includes a main body frame 421, and a plurality of auxiliary frames 422.

The main body frame 421 includes a plurality of axis members 421$x$ extending in an X axis direction, a plurality of axis members 421$y$ extending in a Y axis direction, and plurality of axis members 421$z$ extending in a Z axis direction, and is configured of a rectangular parallelepiped shape framework where the plurality of axis members are mutually combined.

A plurality of axis members 421$x$, 422$y$, 422$z$ configuring the main body frame 421 have axis lengths longer than the plurality of axis members 411$x$, 411$y$, 411$z$ configuring the first base frame 411. In this embodiment, the axis member 421$z$ along the Z axis direction has an axis length greater than a sum of the axis member 411$z$ of the first base frame 411 and the axis member 412$z$ of the second base frame 412.

The plurality of auxiliary frames 422 are located at four sides of the main body frame 421. The auxiliary frames 422 include a plurality of axis members 422$x$ extending in an X axis direction, a plurality of axis members 422$y$ extending in a Y axis direction, and plurality of axis members 422$z$ extending in a Z axis direction, and are configured of a rectangular parallelepiped shape framework where the plurality of axis members are mutually combined.

Upper surface of each auxiliary frame 422 and main body frame 421 are configured to be mutually flush, thereby forming the second top end 42T. At an appropriate position of the second top end 42T, there are provided a plurality of bolt fastening holes for fixing the work table 100.

On the other hand, lower surface of each auxiliary frame 422 and main body frame 421 are configured to be mutually flush, thereby forming the second bottom end 42B. The second bottom end 42B is fixed to the floor S via a plurality of anchor bolts (not shown). The fixed positions by the anchor bolts are not especially limited, and the stand unit 400 is fixed to the floor S at the plurality of fixed positions on the auxiliary frame 422, for example, shown by a symbol P in FIG. 4.

The main body frame 421 and the auxiliary frame 422 are coupled or integrated by bolt fastening or welding the plurality of axis members. The length, the cross-sectional shape, the width or the like of each axis member is not especially limited, and is designed to have predetermined stiffness and strength for stably the work table 100.

(Coupling Frame)

The coupling frame 43 is configured of a plurality of axis members that couple mutually the first bottom end 41B and the second bottom end 42B. The first bottom end 41B and the second bottom end 42B are formed on the same planar surface. The coupling frame 43 is configured of a plurality of axis members in parallel with the planar surface. In this embodiment, as shown in FIG. 4, it is configured of a plurality of axis members 43x extending in the X axis direction, but may be configured of a plurality of axis members extending in the Y axis direction in place of or in addition to them.

A plurality of axis members 43x configuring the coupling frame 43 may be independent axis members, or may be configured of the axis members common to the first stand 41 or the second stand 42. In this embodiment, the axis members 43x are configured of the axis members common to the axis members 411x of the first bottom end 41B, and are coupled or integrated by bolt fastening or welding the axis members 421y of the main body frame 421y.

As the coupling frame 43 is disposed between the first bottom end 41B and the second bottom end 42B, there exist a plurality of axes configuring the first and second stands 41, 42 from the first top end 41T to the second top end 42T. In this manner, a vibration transmission path from the first top end 41T supporting the transfer robot 200 to the second top end 42T supporting the work table 100 can be lengthened as long as possible. Accordingly, vibration generated accompanied by the operation of turn, extension, contraction, etc. of the transfer robot 200 is less transmitted to the work table 100 on which the electronic device W and the mounting unit 300 are placed, and the functional evaluation of the electronic device W can be performed stably and adequately.

In particular in this embodiment, the first stand 41 has the combined structure of the first and second base frames 411, 412, and the second base frame 412 is configured narrower than the first base frame 411. Therefore, a reach distance from the first top end 41T that is the vibration surface to the coupling frame 43 is prolonged by way of the axis members 411x, 411y. In this manner, while the stiffness and the strength of the first stand 41 are increased, a function to inhibit the vibration from transmitting to the work table 100 can be further improved.

Figure 5:
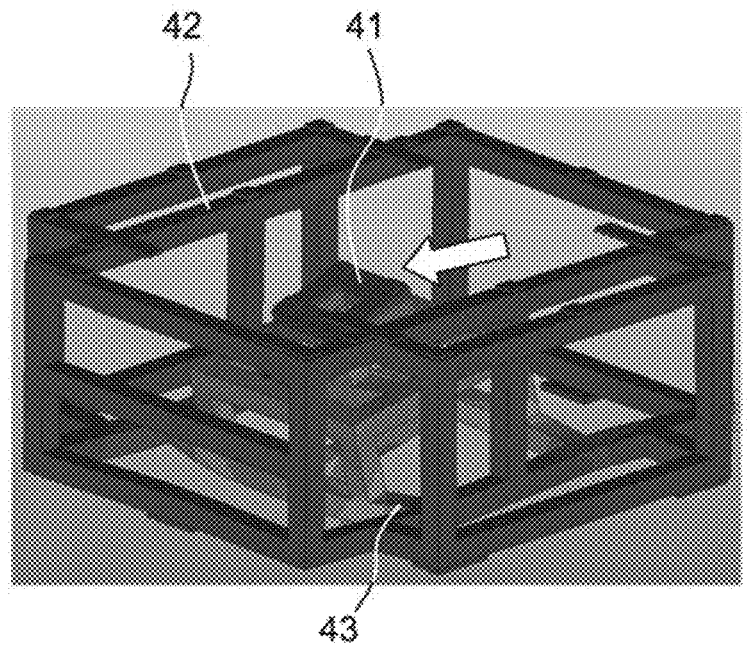
FIG. 5 is a simulation result showing a state of deformation when a static load is applied to a vibration surface of the stand unit.
Figure 6:
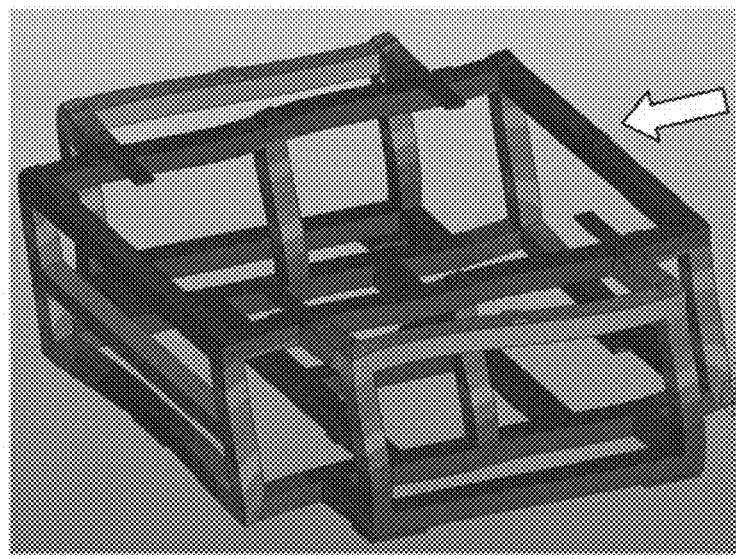
FIG. 6 is a simulation result showing a state of deformation when a static load is applied to a vibration surface of the stand unit according to a comparative embodiment.

FIG. 5 and FIG. 6 are simulation results showing states of deformation when a predetermined static load is applied to each of two stands having different configurations in a direction shown by a white arrow.

FIG. 5 is the simulation result of the stand structure according to this embodiment, and shows the state when a static load is applied to the top end of the first stand 41 from a horizontal direction. As shown in FIG. 5, deformation is stopped at the first stand 41, the coupling frame 43, and the bottom end of the second stand 42, and the top end of the second stand 42 is not deformed.

On the other hand, FIG. 6 is the simulation result of the stand structure according to a comparative embodiment. The electronic device, the mounting unit and the transfer robot are located on the common table in the stand structure of the inspection apparatus in the comparative embodiment. The stand is the same as the second stand, and a static load is applied to the top end in the horizontal direction for determining the deformation. As a result, as shown in FIG. 6, the whole stand is deformed. In particular, the top end supporting the table is significantly deformed. From this, superiority in this embodiment can be easily presumed.

Furthermore, according to this embodiment, as the bottom end 42B of the second stand 42 is fixed to the floor S by a plurality of anchor bolts, a separation effect can be generated for the vibration transmission path at fixed positions on the floor S. In particular, the fixed positions by the anchor bolts are set directly under the axis members (supports) extending in the Z axis direction in the first and second stands 41, 42, thereby being the above-described effect prominent. Even when the fixed positions by the anchor bolts may be set at the coupling frame 43, the similar effects described above can be provided.

As described above, according to the stand unit 400 in this embodiment, even while the electronic devices W are transferred by the transfer robot 200, the functional evaluation thereof can be performed adequately. It is possible to shorten the cycle time for every inspection apparatus. Also, the numbers of the inspection apparatuses can be decreased for realizing a desirable tact.

In addition, in the stand unit 400 in this embodiment, the first stand 41 and the second stand 42 are integrated via the coupling frame 43, location accuracy desirable for the stands 41, 42 can be ensured when the apparatus starts up or a line layout is changed, for example. In this manner, placement workability can be improved when the stand units are located as compared with the case that the two stands are separated.

[Transfer Robot]

Then, the transfer robot 200 will be described in detail.

As shown in FIG. 1, the transfer robot 200 includes a multijoint arm 210, a hand unit 220 connected to a distal end of the multijoint arm 210, and a driving unit 230 connected to a base end of the multijoint arm 210.

The multijoint arm 210 is configured, for example, of a vertical multijoint arm, but is not limited thereto, and may be configured of other multijoint arm including a horizontal multijoint type, SCARA (Selective Compliance Assembly Robot Arm) type, a frog leg type, a parallel link type, etc.

The driving unit 230 is fixed between the multijoint arm 210 and the second base frame 412 of the first stand 41, and drives the multijoint arm 210 and the hand unit 220 on the basis of a control command sent from the controller 90. The controller 90 controls the operation of extension and contraction, and turn around the Z axis of the multijoint arm 210 and turn of the hand unit 220. Typically, the controller 90 executes a program stored in a memory of the controller to operate the transfer robot 200 in a predetermined sequence.

[Clamp Apparatus]

Figure 7:
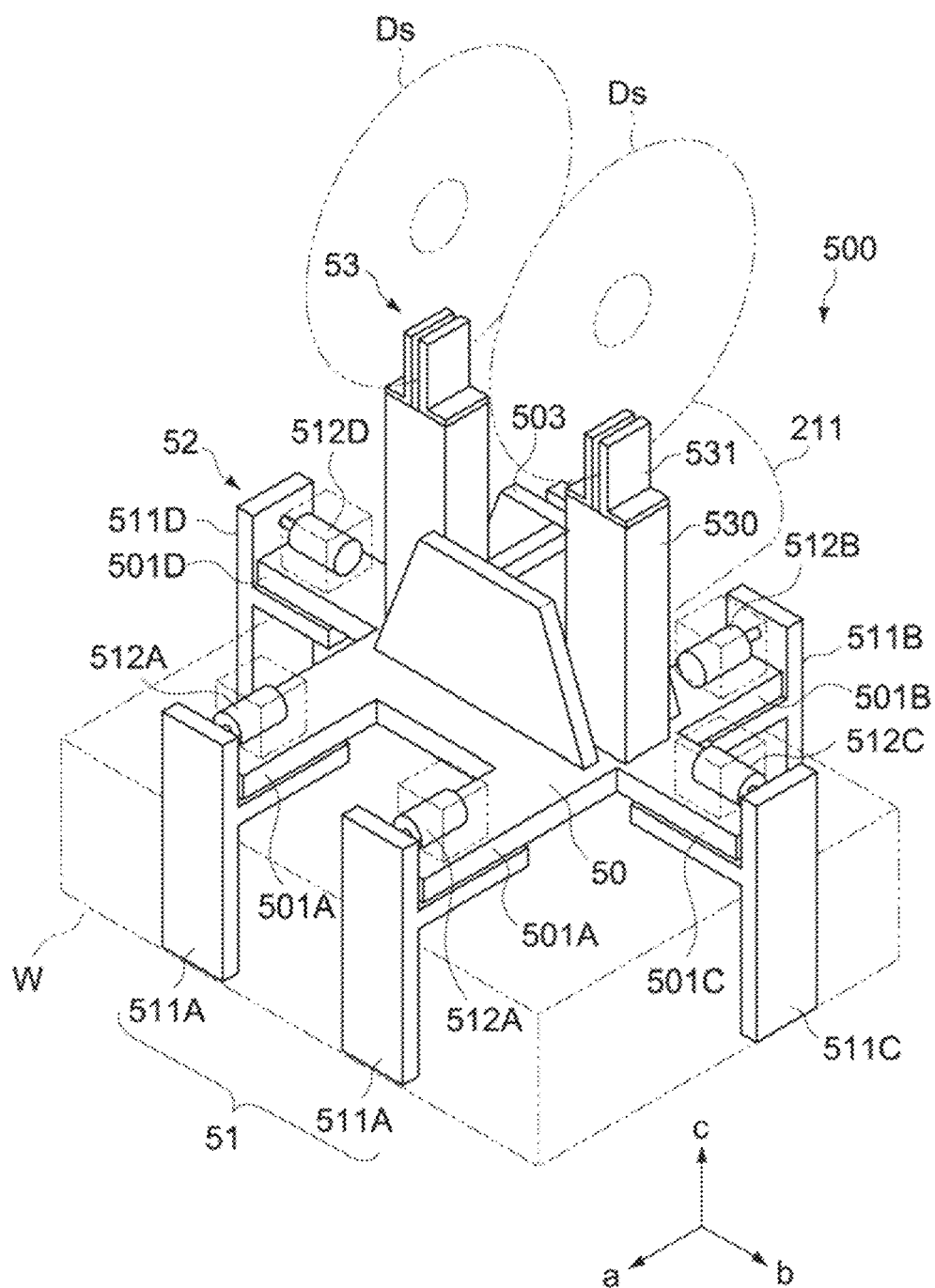
FIG. 7 is a perspective view showing a schematic configuration of a clamp apparatus included in a transfer robot has in the inspection apparatus.

The hand unit 220 is configured of a clamp apparatus that can grip the electronic device W and an optical disc Ds for inspection, as shown in FIG. 7. Hereinafter, the clamp apparatus having a hand unit 220 will be described in detail.

Figure 8:
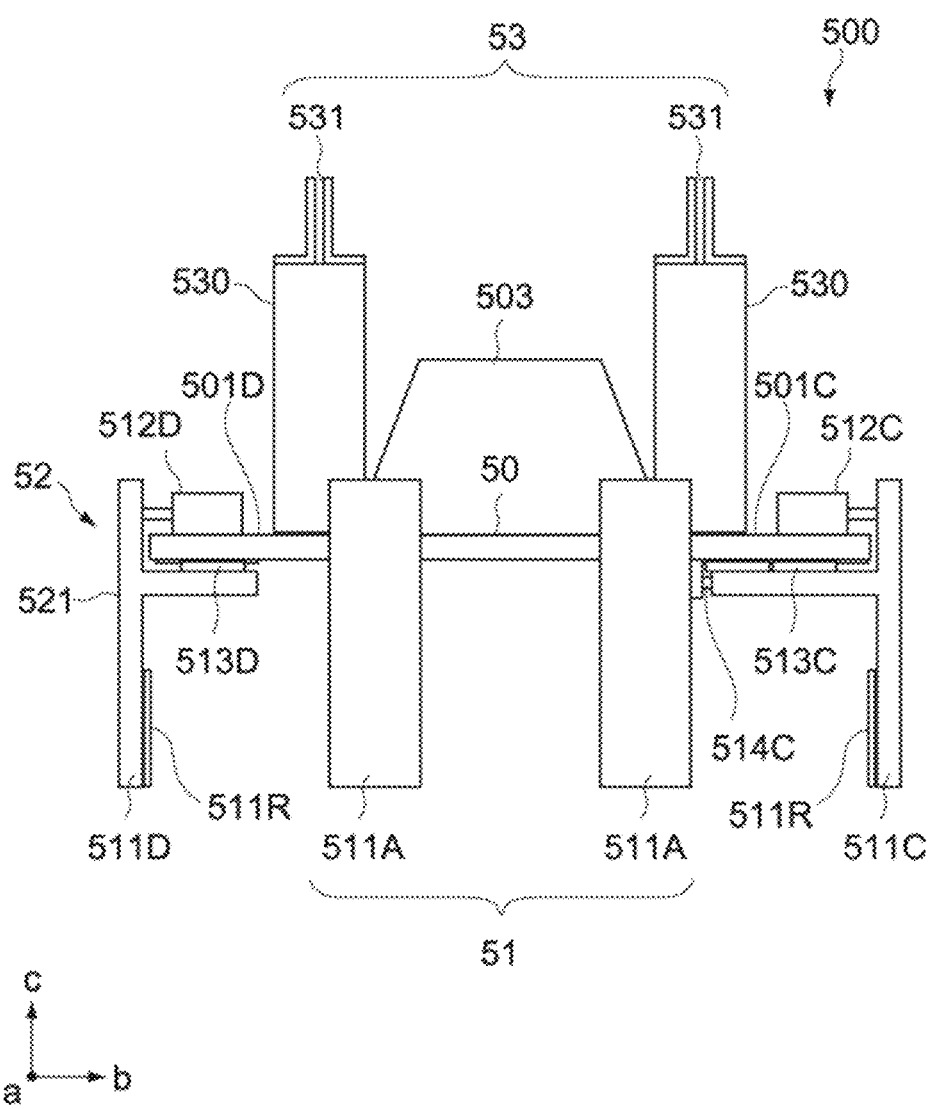
FIG. 8 is a front view of the clamp apparatus.
Figure 9:
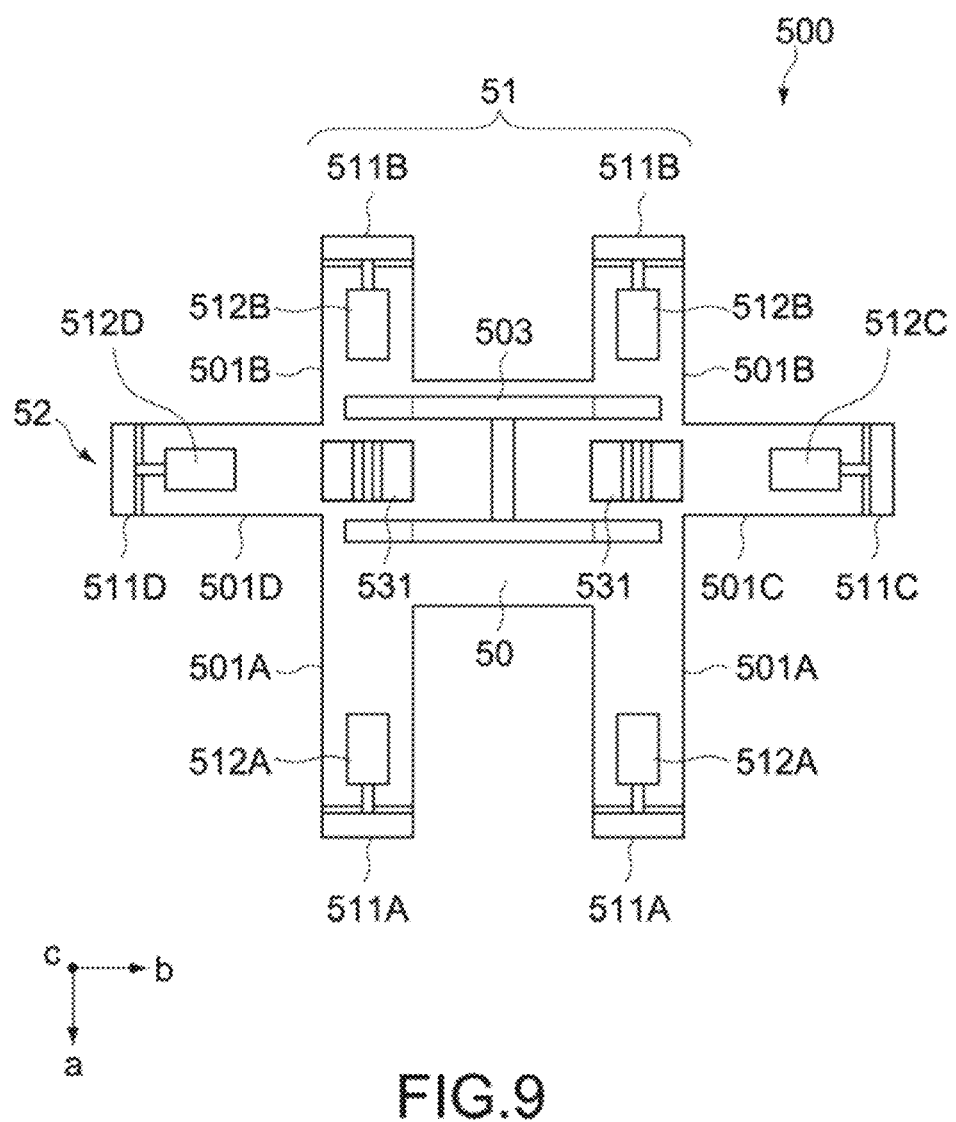
FIG. 9 is a plan view of the clamp apparatus.
Figure 10:
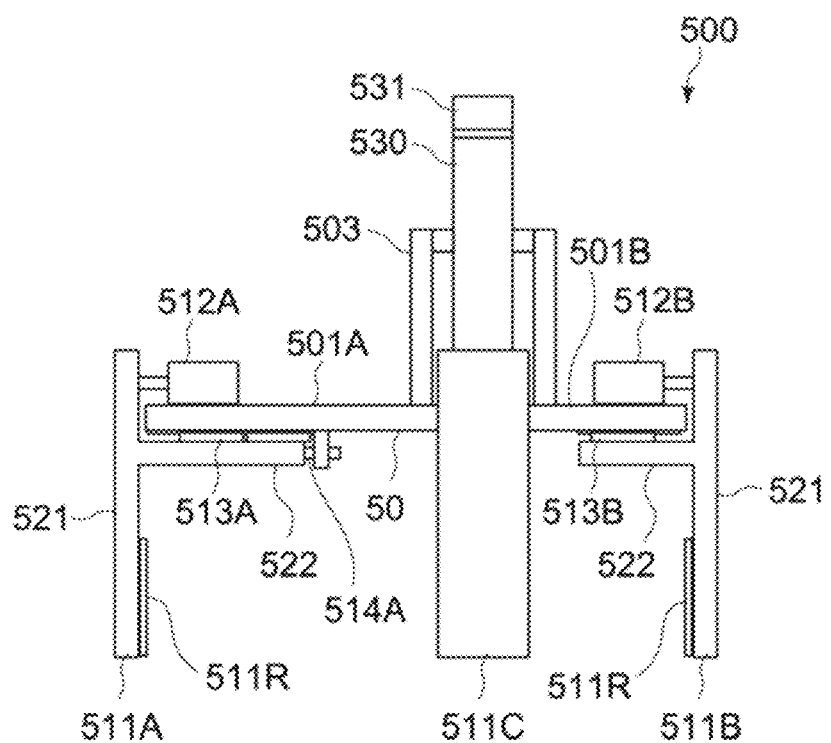
FIG. 10 is a side view of the clamp apparatus.
Figure 11:
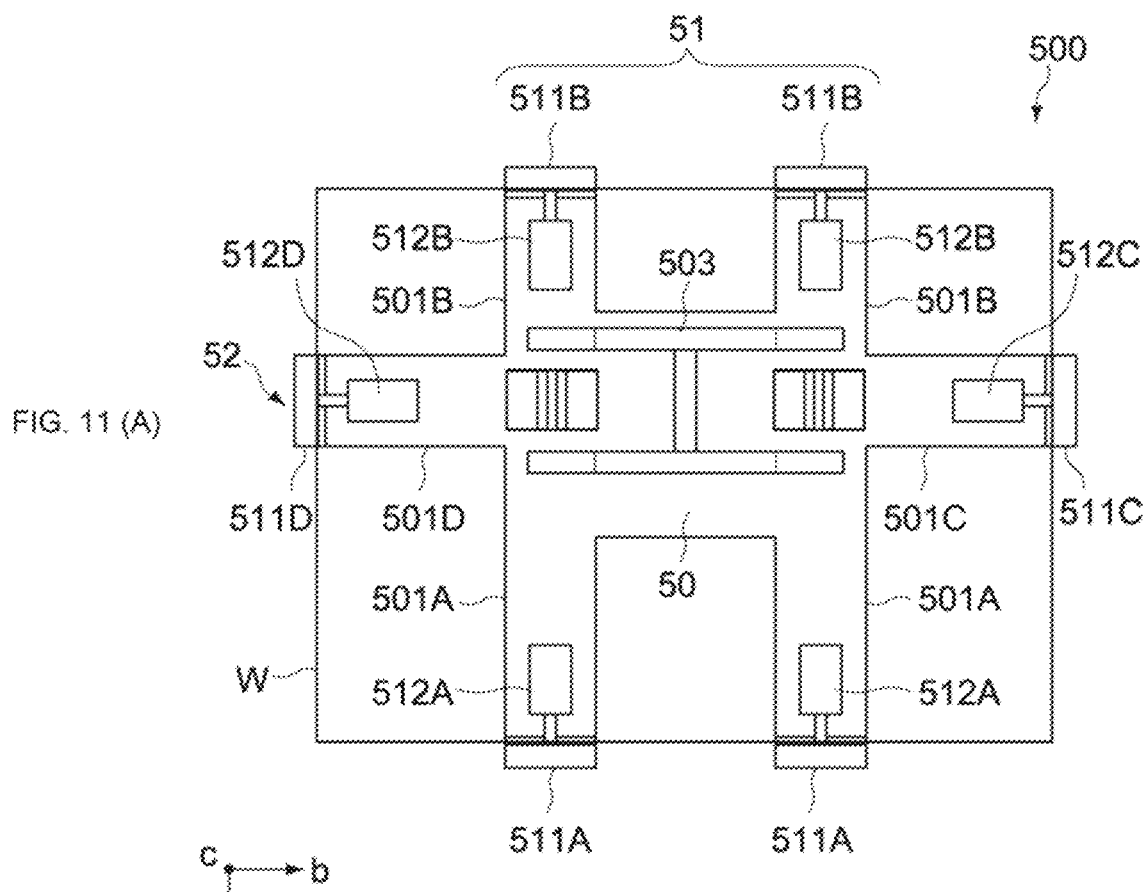
FIG. 11(A) and FIG. 11(B) is a plan view for describing an operation of the clamp apparatus.
Figure 11:
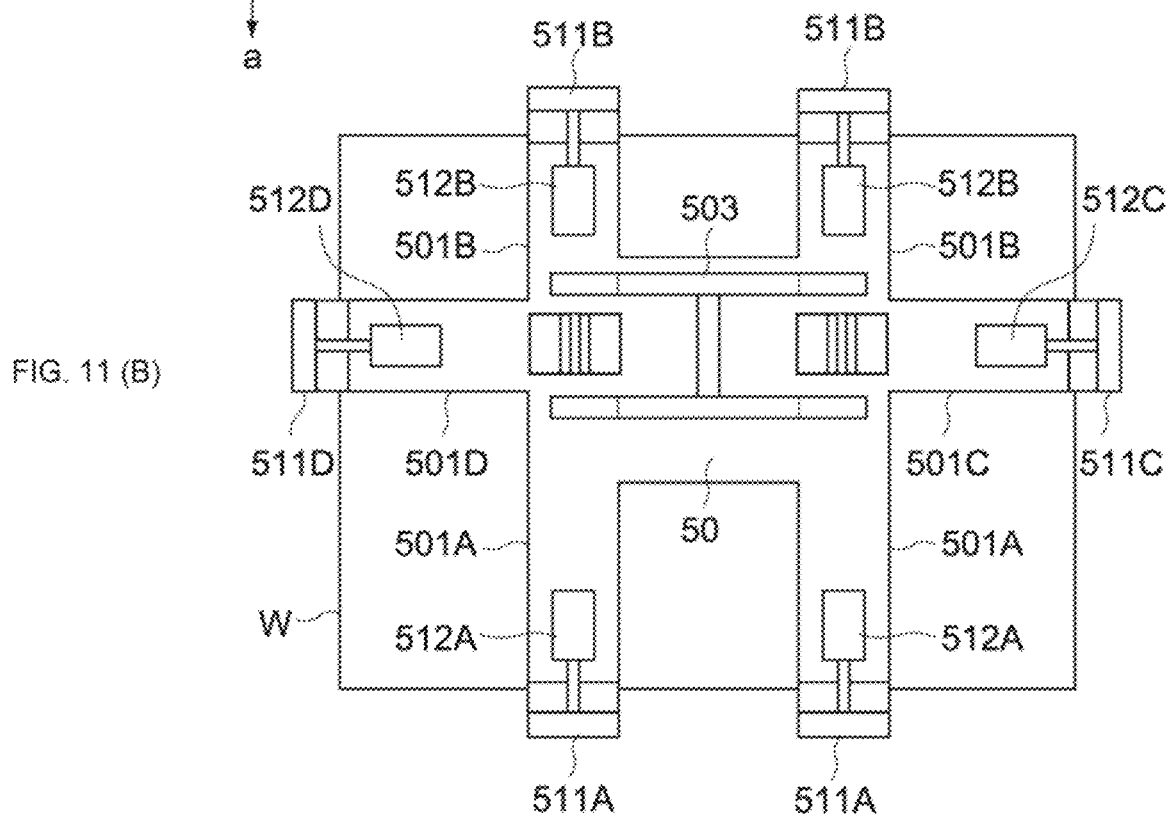
Figure 12:
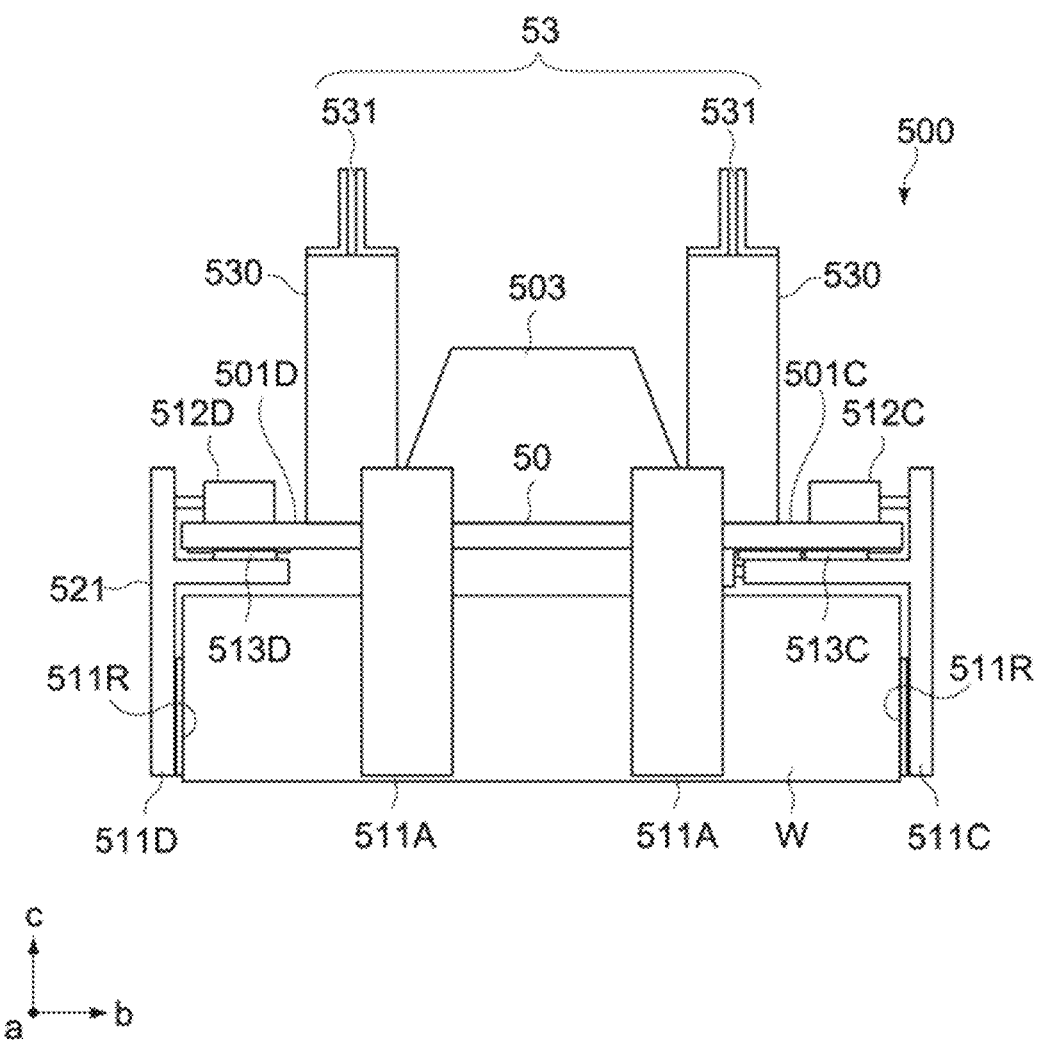
FIG. 12 is a front view for describing an operation of the clamp apparatus.

FIG. 7 to FIG. 12 are overall views each showing a schematic configuration of a clamp apparatus 500 configuring the hand unit 220, FIG. 7 is a perspective view, FIG. 8 is a front view, FIG. 9 is a plan view, FIG. 10 is a side view, FIG. 11 each is a plan view for describing an operation of the clamp apparatus 500, and FIG. 12 is a front view. In each drawing, "a" axis, "b" axis and "c axis" show three axis directions that are mutually orthogonal. In particular, the "a" axis direction shows a front direction of the clamp apparatus 500.

The clamp apparatus 500 includes a base unit 50, a first clamp unit 51, a second clamp unit 52, and a third clamp unit 53. The first and second clamp units 51, 52 configure a "first clamp apparatus" that can grip the electronic device W, and a third clamp unit 53 configures a "second clamp apparatus" that can grip the optical disc Ds.

(Base Unit)

The base unit 50 is configured of a metal material such as an aluminum alloy, and is a plate-shaped member having a major surface parallel to an ab plane.

The base unit 50 includes a plurality of plate-shaped protruded pieces 501A, 501B, 501C and 501D that protrude from peripherals to the "a" axis direction and the "b" axis direction, respectively. The protruded pieces 501A and 501B face to the "a" axis direction, and the protruded pieces 501C and 501D face to the "b" axis direction. Two sets of the protruded pieces 501A and 501B are formed facing to the "b" axis direction. On the other hand, one set of the protruded pieces 501C and 501D are formed at a position deviated to a protruded piece 501B side.

On the major surface of the base unit 50, a connection unit 503 that is connected to a distal end 211 of the multijoint arm 210 (see FIG. 7). The connection unit 503 is connected rotatably around the "a" axis to the distal end of the multijoint arm 210.

(First Clamp Unit)

The first clamp unit 51 includes claw units 511A, 511B (first and second claw units), driving sources 512A, 512B (first and second driving sources), and linear guides 513A, 513B (first and second linear guides).

The claw units 511A, 511B mutually face to the "a" axis direction, and clamp the electronic device W at a first clamp position in the "a" axis direction. The driving sources 512A, 512B are connected to the claw units 511A, 511B, and move the claw units 511A, 511B to the first clamp position. The linear guides 513A, 513B are disposed at the base unit 50, and support movably the claw units 511A, 511B to the base unit 50.

The claw unit 511A is attached movably to the protruded piece 501A in the "a" axis direction. The claw unit 511B is attached movably to the protruded piece 501B in the "a" axis direction. In this embodiment, two sets of the claw units 511A, 511B are arrange in the "b" axis direction.

The claw units 511A, 511B include a vertical plate unit 521 having a width direction in the "b" axis direction and a length direction in the "c" axis direction, and a horizontal plate unit 522 having a width direction in the "b" axis direction and a length direction in the "a" axis direction. An elastic protection layer 511R made, for example, of silicone rubber is disposed at an inner side of the horizontal plate unit 521 that is a contact region to the electronic device W. This allows adhesion between the claw units 511A, 511C and the electronic device W to be improved, and the electronic device from damaging upon clamping.

The driving source 512A is fixed to one major surface of the protruded piece 501A (upper surface in FIG. 10), and is connected to the vertical plate unit 521 of the claw unit 511A via a driving rod that extends and contracts in the "a" axis direction. The driving source 512B is fixed on one major surface of the protruded piece 501B (upper surface in FIG. 10), and is connected to the vertical plate unit of the claw unit 511B via a driving rod that extends and contracts in the "a" axis direction. The driving sources 512A, 512B are fixed to ends of the protruded pieces 501A, 501B or in the vicinity thereof. The driving sources 512A, 512B are configured of air cylinders, or may be configured of other actuator such as an oil hydraulic cylinder, an electric motor, and the like besides them. Operations of the driving sources 512A, 512B are controlled by the controller 90.

A linear guide 513A is disposed at other major surface of the protruded piece 501A (lower surface in FIG. 10). A linear guide 513B is disposed at other major surface of the protruded piece 501B (lower surface in FIG. 10). The linear guides 513A, 513B are configured of guide rails disposed at protruded pieces 501A, 501B sides and extending to the "a" axis direction, and sliders that are movable along the guide rails and fixed to the horizontal plate units 522 of the claw units 511A, 511B.

(Second Clamp Unit)

On the other hand, the second clamp unit 52 includes claw units 511C, 511D (third and fourth claw units), driving sources 512C, 512D (third and fourth driving sources), and linear guides 513C, 513D (third and fourth linear guides).

The claw units 511C, 511D mutually face to the "b" axis direction, and clamp the electronic device W at a second clamp position in the "b" axis direction. The driving sources 512C, 512D are connected to the claw units 511C, 511D, and move the claw units 511C, 511D to a second clamp position. The linear guides 513C, 513D are disposed at the base unit 50, and support movably the claw units 511C, 511D to the base unit 50.

The details about the claw units 511C, 511D, the driving sources 512C, 512D and the linear guides 513C, 513D are similar to the claw units 511A, 511B, the driving sources 512A, 512B and the linear guides 513A, 513B described above, and therefore the description is omitted here.

(Third Clamp Unit)

A third clamp unit 53 is for clamping the optical disc Ds, and is disposed at the major surface of the base unit 50. The third clamp unit 53 includes a pair of columns 530 stood at the major surface of the base unit 50, and a pair of clamps 531 disposed at distal ends of the pair of columns 530. The pair of columns 530 and the pair of clamps 531 have the same structures.

The pair of columns 530 are disposed mutually facing to the major surface of the base unit 50 in the "b" axis direction. The pair of clamps 531 are configured to be capable of clamping the optical disc Ds in the "b" axis direction. The driving source of the clamp 531 is disposed inside of the columns 530, and is configured of an appropriate actuator such as an air cylinders, an oil hydraulic cylinder, an electric motor, and the like.

(Action Example of First and Second Clamp Units)

The claw units 511A, 511B are configured to be capable of moving between the first clamp position that clamps the electronic device W in the "a" axis direction by the driving sources 512A, 512B (FIG. 11A, FIG. 12) and a clamp cancellation position (FIG. 11B) where a clamp operation is canceled. On the other hand, the claw units 511C, 511D are configured to be capable of moving between the second clamp position that clamps the electronic device W by the driving source 512C, 512D in the "b" axis direction (FIG. 11A, FIG. 12) and a clamp cancellation position (FIG. 11B) where a clamp operation is canceled.

The clamp action by the first and second clamp units 51, 52 described above may be performed at the same time, or at a different timing. In addition, a clamp force in the respective clamp units 51, 52 is not especially limited as long as a chucking force is provided to stably clamp and transfer the electronic device W.

In this embodiment, the clamp apparatus 500 can clamp stably the electronic device W by a clamp operation from two axes directions. Also, the plurality of claw units 511A to 511C are driven by the plurality of driving sources 512A to 512D disposed independently, and are supported by the protruded pieces 501A to 501D via the linear guides 513A to 513D. In this manner, high durability is provided on a moment load that operates on the claw units 511A to 511D upon clamping the electronic device W. Accordingly by this embodiment, it will be possible to maintain the high transfer accuracy even if the electronic device has a large size and a heavy weight.

Figure 13:
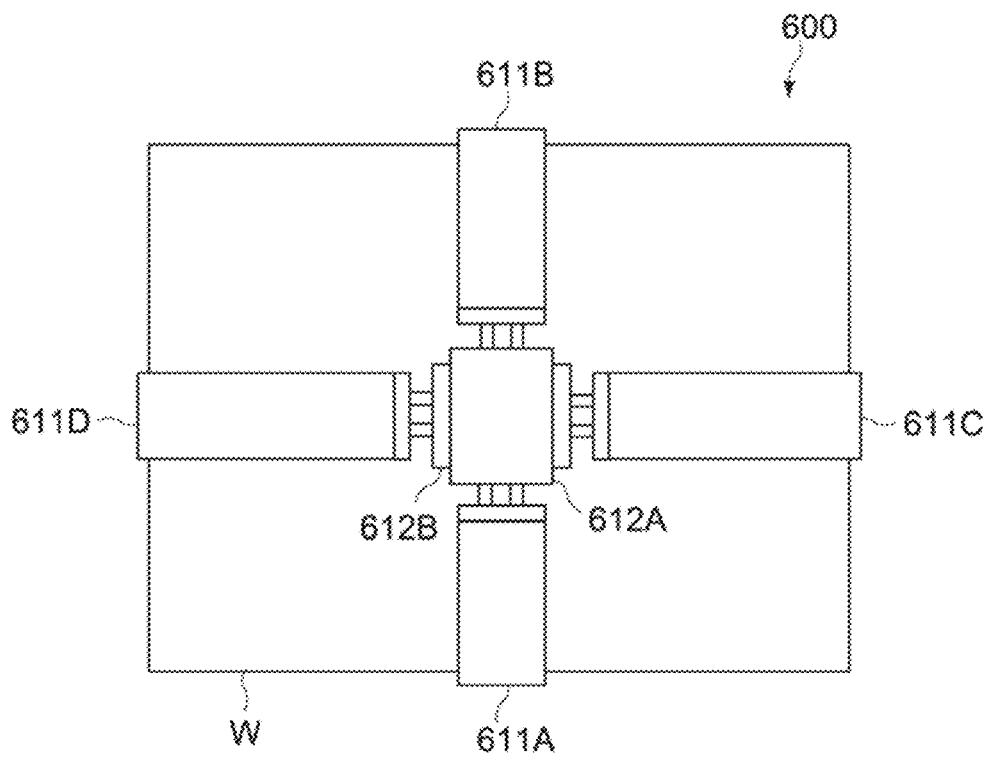
FIG. 13(A) and FIG. 13(B) are a plan view and a front view showing a schematic configuration of a clamp apparatus according to a comparative embodiment.
Figure 13:
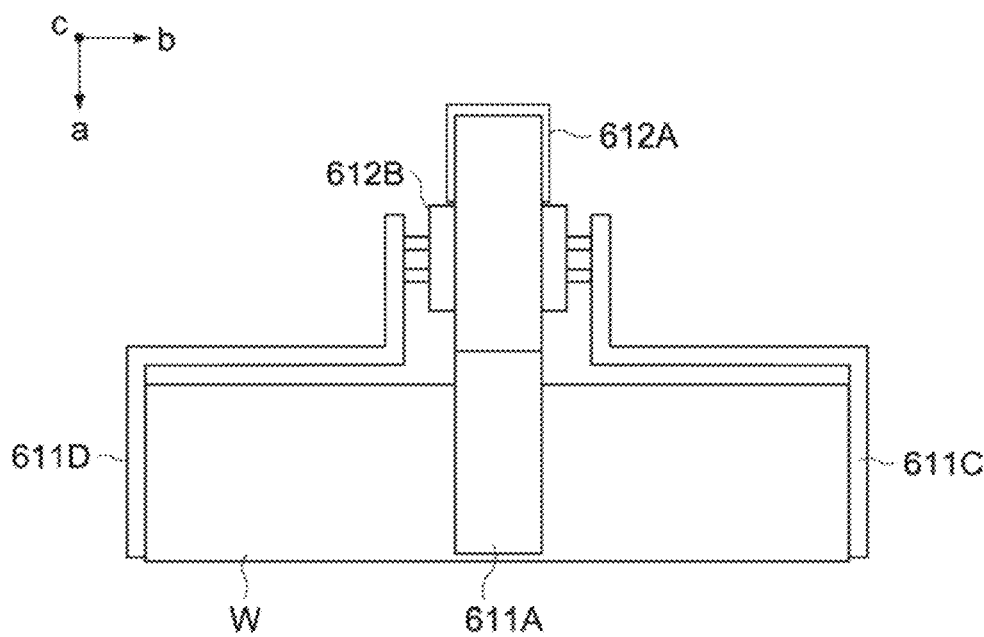

FIGS. 13A, B are a plan view and a front view showing a schematic configuration of a clamp apparatus 600 according to a comparative embodiment.

The clamp apparatus 600 includes a pair of claw unit 611A, 611B facing to the "a" axis direction, a pair of claw unit 611C, 611D facing to the "b" axis direction, a first driving source 612A that drives the pair of claw units 611A, 611B in common, and a second driving source 612B that drives the pair of claw unit 611C, 611D in common. The first and second driving sources 612A, 612B are disposed facing to the "c" axis direction at a center position of the electronic device W.

In the clamp apparatus 600 according to the comparative embodiment having the above-described configuration, a distance to support points of the electronic device W in the driving sources 612A, 612B and the claw units 611A to 611D is long. This adds a great moment load to the driving sources 612A, 612B. When the stiffness and the strength of the clamp apparatus 600 are low, it is difficult to ensure speed up of the transfer action and the transfer accuracy.

In contrast, in the clamp apparatus 500 in this embodiment, the driving sources 512A to 512D of the claw units 511A to 511D are independent, and the respective driving sources 512A to 512D are fixed to the distal ends of the respective protruded pieces 501A to 501D of the base unit. Accordingly, the distance between the driving sources 512A to 512D and the claw units 511A to 511D can be decreased. Therefore, the moment loads added to the respective driving sources 512A to 512D can be decreased. In this manner, without increasing extremely the stiffness and the strength of the base unit 50, the transfer action can be speed-up, and the predetermined transfer accuracy can be maintained.

(Clamp Method)

Next, a clamp method of the electronic device W by the clamp apparatus 500 in this embodiment will be described.

Figure 14:
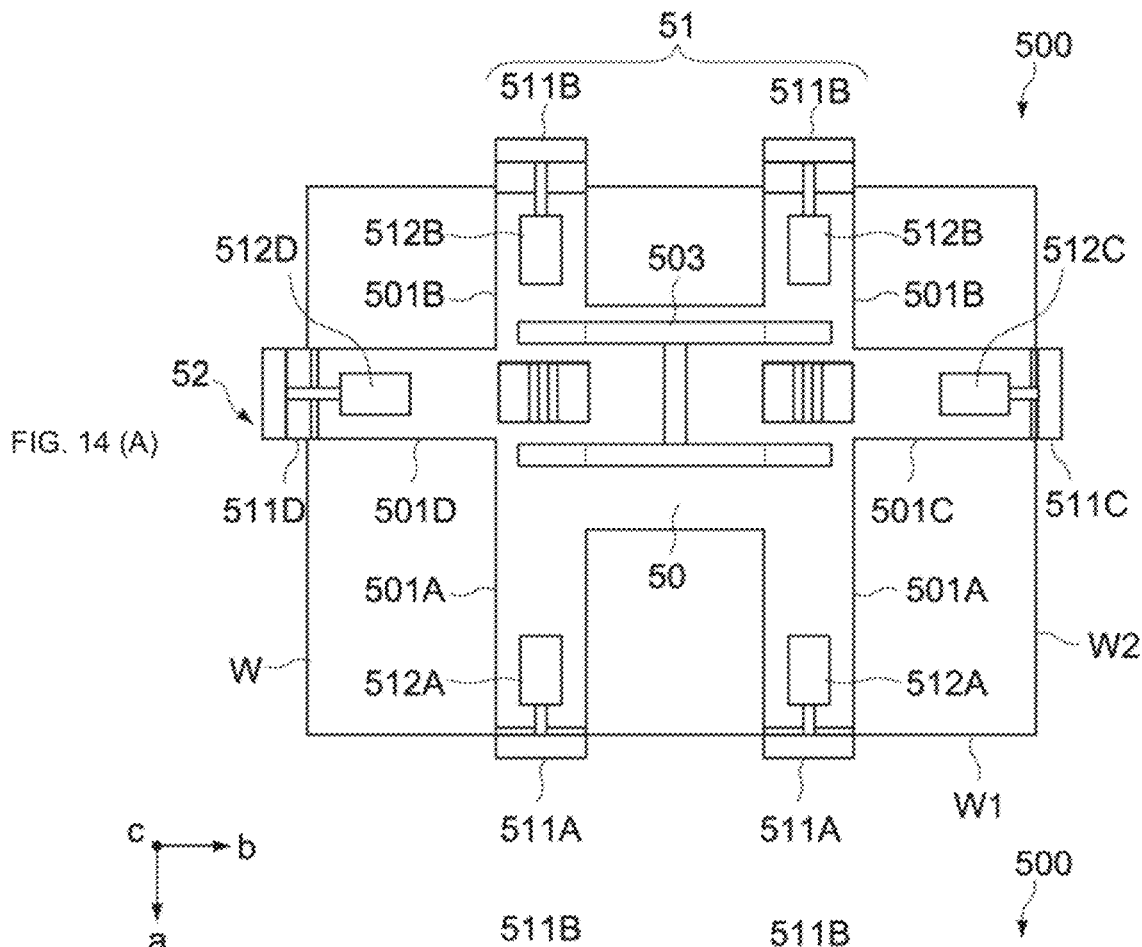
FIG. 14(A) and FIG. 14(B) are plan views of a clamp apparatus showing a clamping procedure of an electronic device in a lying state.
Figure 14:
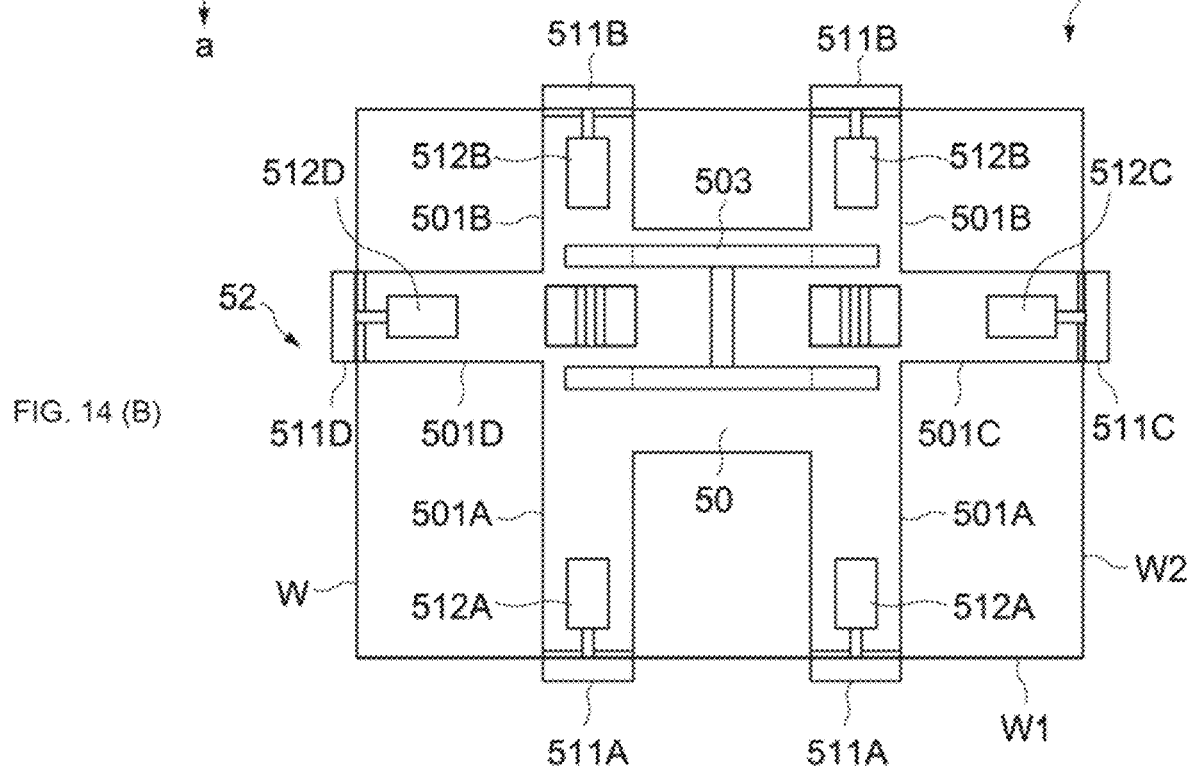

FIGS. 14A, B are plan views of the clamp apparatus 500 showing a clamping procedure of the electronic device W in a lying state.

The respective claw units 511A to 511D of the clamp apparatus 500 are disposed by the multijoint arm 210 at predetermined spaces to a peripheral surface of the electronic device W on the transfer line 20. Then, the clamp apparatus 500 clamps the electronic device W by the procedure shown in FIGS. 14A, B.

Firstly, as shown in FIG. 14A, the clamp apparatus 500 drives the driving sources 512A, 512C to move the claw unit 511A and the claw unit 511C to the first and second clamp positions. Then, as shown in FIG. 14B, the clamp apparatus 500 drives the driving sources 512B, 512D to move the remaining claw units 511B, 511D to the first and second clamp positions.

Here, in this embodiment, the first and second clamp units 51, 52 have regulating units 514A, 514C (first and second regulating units) for regulating the respective first clamp positions for the claw units 511A, 511C at one side. The regulating unit 514A is disposed at the other major surface of the protruded piece 501A so as to face the distal ends of the horizontal plate unit 522 of the claw unit 511A, as shown in FIG. 10. On the other hand, the regulating unit 514C is disposed at the other major surface of the protruded piece 501C so as to face the horizontal plate unit 522 of the claw unit 511C, as shown in FIG. 8.

By regulating the first clamp position of the claw units 511A, 511C, it is possible to position the electronic device W on the basis of the clamp positions of the claw units 511A, 511C. For example, even when the positions of the claw units 511A to 511C are deviated to the peripheral surface of the electronic device W, two side surfaces W1, W2 of the electronic device W are positioned to the clamp apparatus 500 by the claw units 511A, 511B. Even if the claw units 511A, 511C are regulated from moving by the regulating units 514A, 514C before they are in contact with the electronic device W, the electronic device W moves toward the claw units 511A, 511C by driving the claw units 511B, 511D thereafter, thereby ensuring intended positioning accuracy.

The driving force of each of the driving sources 512A, 512B when the claw units 511A, 511B are moved to the first clamp position is not limited to the same, and may be different. Similarly, the driving force of each of the driving sources 512C, 512D when the claw units 511C, 511D are moved to the first clamp position is not limited to the same, and may be different.

In this embodiment, the driving sources 512A, 512C at one side has driving forces greater than the driving sources 512B, 512C at the other side. Thus, the claw units 511A, 511C at one side are moved toward the first and second clamp positions with the driving force greater than that of the claw units 511B, 511D at the other side. A difference between the driving force (first driving force) of the driving sources 512A, 512C and the driving force (second driving force) of the driving sources 512B, 512D is not especially limited. For example, the first driving force is set to be 1.5 times or more of the second driving force.

By the above-described configuration, regardless that the claw units 511A, 511C are in contact with the side surfaces W1, W2 of the electronic device W, the claw units 511A, 511C are pushed to the regulating units 514A, 514C by the first driving force. In this state, the claw units 511B, 511D push the other side surfaces of the electronic device W by the second driving force. In this manner, the electronic device W is clamped while it is always pushed to the claw units 511A, 511C. Therefore, predetermined positioning accuracy is ensured on the clamp apparatus 500 during the transfer.

Note that the claw units 511A, 511C supporting reference surfaces (W1, W2) of the electronic device W may be designed to have high stiffness or strength as compared with the other claw units 511B, 511D by increasing the number of sliders configuring the linear guides 513A, 513C, etc.

The electronic device W clamped as described above is converted into a stand posture where the side surface W1 faces downward by the multijoint arm 210, and then is transferred to a predetermined inspection position of the work table 100. At this time, a recess part is disposed to house the claw unit 511A of the clamp apparatus 500 at the inspection position, whereby a clamp cancellation action is possible after the transfer.

On the other hand, the inspection apparatus 10 transfers the inspected electronic device W on the transfer line 20 from the work table 100. Also at this time, the electronic device W on the work table 100 is clamped by the clamp apparatus 500 using the procedure shown in FIGS. 14A, B.

[Mounting Unit]

Then, the mounting unit 300 will described in detail. The plurality of mounting units 300 on the work table 100 have the same configuration.

Figure 15:
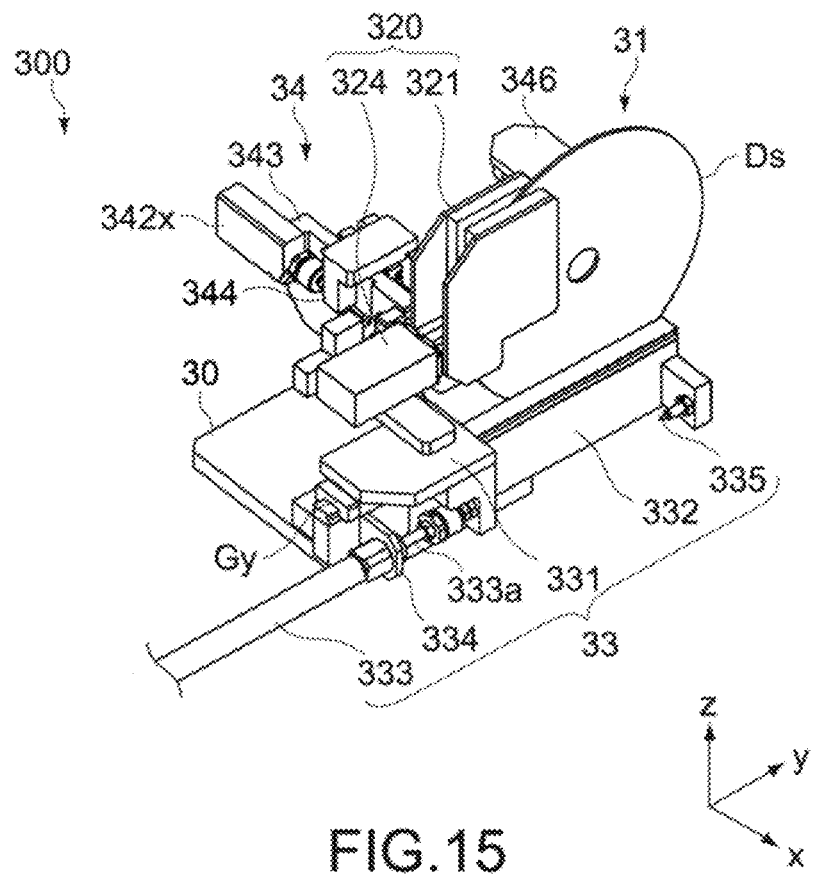
FIG. 15 is a perspective view viewed from one side of a mounting unit in the inspection apparatus.
Figure 16:
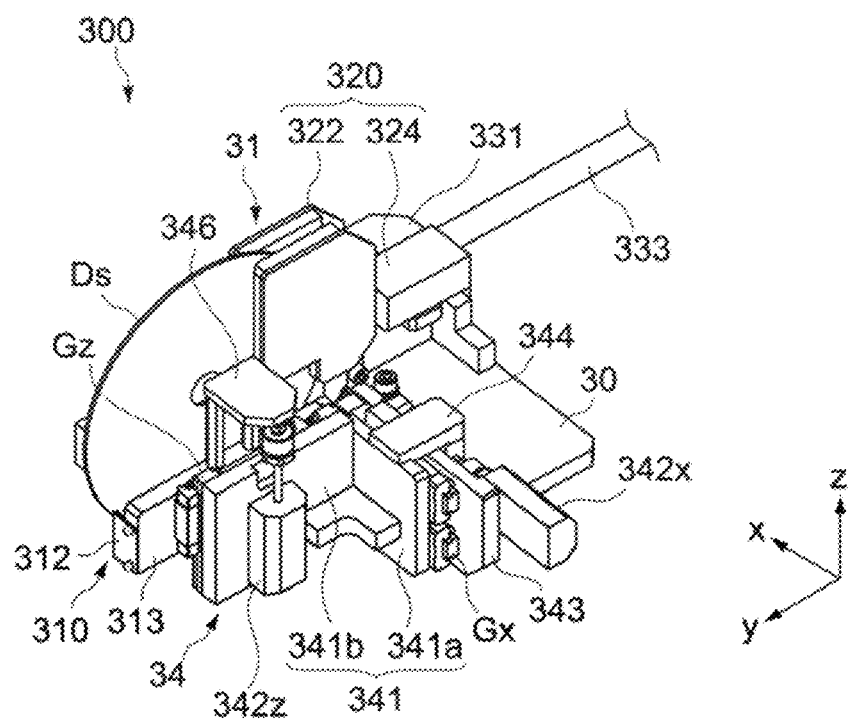
FIG. 16 is a perspective view viewed from the other side of the mounting unit.
Figure 17:
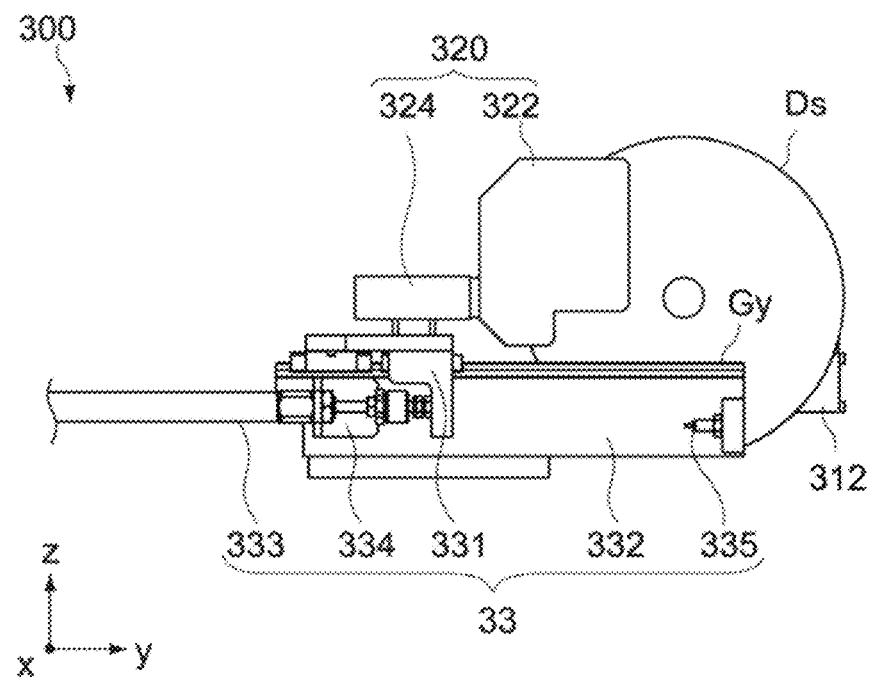
FIG. 17 is a side view of the mounting unit.
Figure 18:
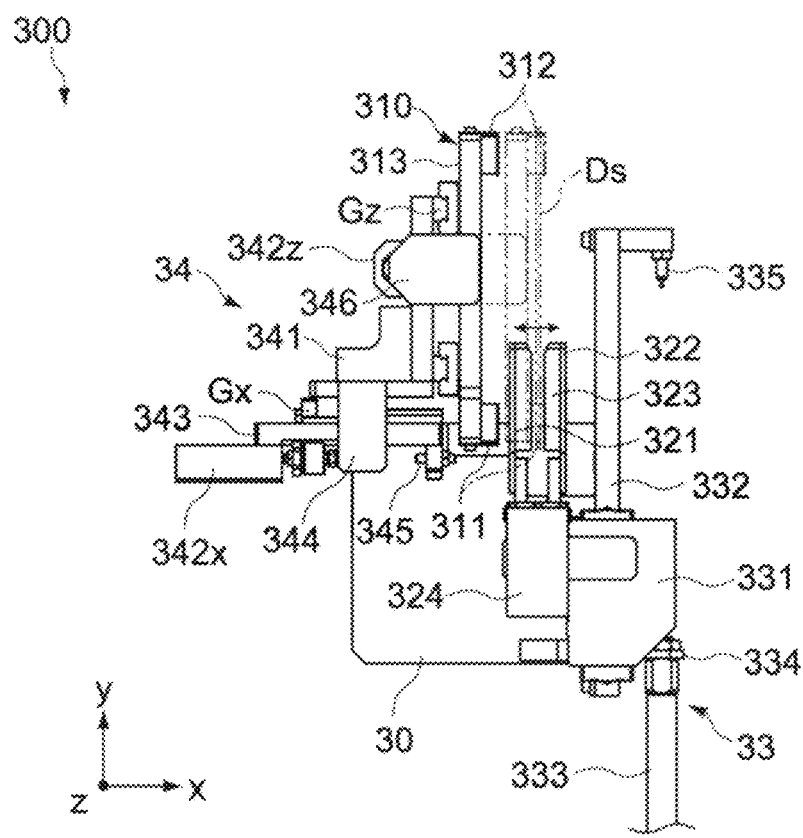
FIG. 18 is a plan view of the mounting unit.

FIGS. 15 to 18 are overall views showing one configuration example of the mounting unit 300. FIG. 15 is a perspective view viewed from one side. FIG. 16 is a perspective view viewed from the other side. FIG. 17 is a side view. FIG. 18 is a plan view. In each drawing, X axis and Y axis directions show mutually orthogonal horizontal directions, and a Z axis direction shows a height direction orthogonal to them.

The mounting unit 300 has a function as a relay robot that the optical disc Ds for inspection is transferred between the transfer robot 200 and the electronic device W. The mounting unit 300 includes a base unit 300, a support 31 for supporting the disc Ds transferred by the transfer robot 200, and a driving unit 33 for transferring the support 31 toward the electronic device W on the work table 100 (rotary table unit 110).

The support 31 and the driving unit 33 are disposed on the base unit 30. The base unit 30 is configured of a substantially rectangle metal plate, and is disposed on the fixed table unit 111 on the work table 100. The base unit 30 is positioned at a predetermined height from the upper surface of the work table 100 via legs (not shown). The base unit 30 is disposed on each mounting unit 300, but may be disposed commonly to the plurality of mounting units 300.

(Support)

The support 31 includes a receptor unit 310 that can receive the optical disc Ds transferred by the transfer robot 200, and a gripping unit 320 that can grip the optical disc Ds received by the receptor unit 310.

As shown in FIG. 18, the receptor unit 310 includes a pair of support pieces 311, 312 that can support two lower ends of the optical disc Ds, and a plate member 313 that holds integrally the pair of support pieces 311, 312. The plate member 313 is configured of a substantially rectangular metal plate having long sides in the y direction. The pair of support pieces 311, 312 are fixed to both ends of the plate member 313 at the long sides.

Figure 19:
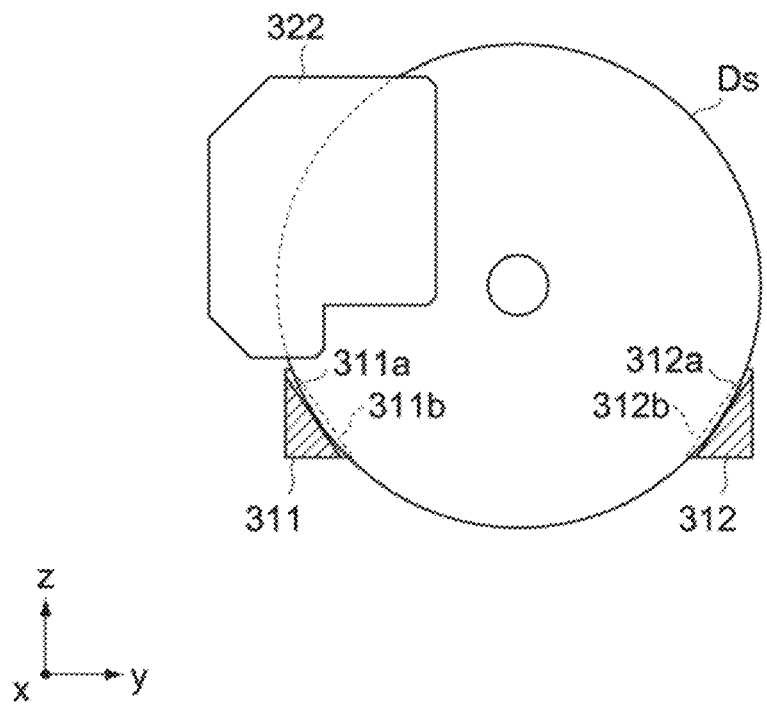
FIG. 19 is a principal schematic cross-sectional view of a receptor unit in the mounting unit.

FIG. 19 is a principal schematic cross-sectional view of the receptor unit 310 that receives the optical disc Ds. The pair of support pieces 311, 312 are formed in substantially right angle triangular shape, and are disposed mutually facing in the y axis direction. The receptor unit 310 has a positioning mechanism for positioning the optical disc Ds in a yz plane to a parallel predetermined posture.

Specifically, in this embodiment, the support pieces 311, 312 support the lower ends of the optical disc Ds at respective slope parts 311a, 312a. At both ends of the respective slope parts 311a, 312a, a pair of walls 311b and a pair of walls 312b facing mutually to the x axis direction and protruding to the center of the optical disc Ds are formed. Between the pair of walls 311b and the pair of walls 312b, the lower ends of the optical disc Ds are accommodated. The distance between the pair of walls 311b and the distance between the pair of walls 312b are formed to have predetermined length such that the optical disc Ds is positioned in a predetermined posture. The distance may be gradually narrowed toward the slope parts 311a, 312a.

The gripping unit 320 includes a pair of clamp pieces 321, 322 that can clamp the optical disc Ds received by the receptor unit 310 in the x axis direction, and a driving source 324 that brings the pair of clamp pieces 321, 322 mutually closer or away along the x axis direction.

The gripping unit 320 is disposed directly above the receptor unit 310. The pair of clamp pieces 321, 322 are configured to face a recording surface and its opposite surface of the optical disc Ds supported by the support pieces 311, 312 of the receptor unit 310. The driving source 324 enlarges the space between the pair of clamp pieces 321, 322 greater than the thickness of the optical disc Ds in the state that the optical disc Ds is not clamped (initial position). At this time, the pair of clamp pieces 321, 322 inhibit the optical disc Ds received by the receptor unit 310 (support pieces 311, 312) from fallen. This provides a support structure of the optical disc Ds by the receptor unit 310 and the gripping unit 320.

The pair of clamp pieces 321, 322 are configured to grip the predetermined position on the recording surface of the optical disc Ds and its opposite surface by the driving source 324. On an inner surface where the pair of clamp pieces 321, 322 are mutually faced, pad units 323 (first pad unit and second pad unit) are adhered. Each pad unit 323 is configured of an elastic material to intimately and elastically adhere to the recording surface and a non-recording surface of the optical disc Ds.

Figure 20:
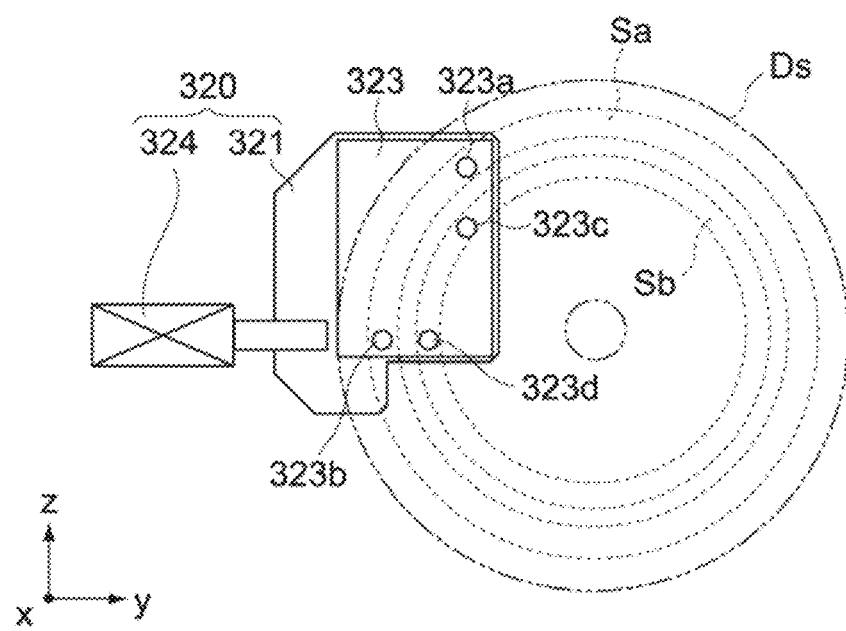
FIG. 20 is a schematic cross-sectional view of a gripping unit in the mounting unit.

FIG. 20 is a schematic cross-sectional view of the gripping unit 321 showing a relative relationship between the clamp piece 321 and the optical disc Ds.

At the pad unit 323 (first pad unit) adhered to the clamp piece 321 of the pair of clamp pieces 321, 322 facing to the recording surface of the optical disc Ds, there are disposed a plurality of protrusions 323a to 323d that protrude toward the recording surface. The plurality of protrusions 323a to 323d are mutually positioned so as to be in contact with a predetermined region on the recording surface of the optical disc Ds.

In the optical disc Ds according to this embodiment, inspection data (information) is recorded discrete in a radial direction. Specifically, as shown in FIG. 20, a plurality of concentric circle information non-recorded regions Sa, Sb where no inspection data is recorded are formed on the recording region of the optical disc Ds. The plurality of protrusions 323a to 323d are configured to be in contact with the information non-recorded regions Sa, Sb. In the embodiment shown, the protrusions 323a, 323d are disposed facing to the information non-recorded region Sa, and the protrusions 323c, 323d are disposed facing to the information non-recorded region Sb.

The number of the protrusions 323a to 323d is not limited to the above, and at least one, preferably three or more are disposed. The protrusions 323a to 323d are typically integrally formed with the pad unit 323 using the same material as the pad unit 323. The pad unit 323 is preferably configured of a rubber material, for example, having high releasing properties, in order to prevent from adhering to the optical disc Ds.

(Movement Mechanism)

The mounting unit 300 further includes a movement mechanism 34 that moves the receptor unit 310 parallel to the z axis direction and the x axis direction, as shown in FIG. 16 and FIG. 18.

The movement mechanism 34 includes a support member 341 that supports the receptor unit 310, a first driving cylinder 342x that can move the support member 341 relatively to the base unit 30 in the x axis direction, and a second driving cylinder 342z that can move the receptor unit 310 relatively to the support member 341 in the z axis direction.

The support member 341 includes a first plate member 341a parallel to the xz plane and a second plate member 341b parallel to the yz plane, as shown in FIG. 16. The first and second plate members 341a, 341b are mutually coupled via an appropriate coupling member.

The first plate unit 341a is attached to one major surface of a retainer 343 integrally fixed to the base unit 30 via a first linear guide Gx extending parallel to the x axis direction. The first driving cylinder 342x is fixed to the other major surface of the retainer 343. The first driving cylinder 342x has a driving rod extending and contracting in the x axis direction, and a distal end of the driving rod is fixed to a coupling member 344 coupled to the first plate unit 341a across the retainer 343.

Thus, the support member 341 is configured to be capable of reciprocating in the x axis direction via the first linear guide Gx by extending and contracting the driving rod of the first driving cylinder 342x. To the retainer 343, a stopper 345 that specifies a maximum extended position of the driving rod being in contact with the coupling member 344 (see FIG. 18). The maximum extended position of the driving rod determines an x position where the receptor unit 310 accepts the optical disc Ds.

To one major surface of the second plate unit 341b, the plate member 313 of the receptor unit 310 is attached via a second linear guide Gz extended in parallel to the z axis direction. The second driving cylinder 342z is fixed to the other major surface of the second plate unit 341b. The second driving cylinder 342z has a driving rod extending and contracting in the z axis direction, and a distal end of the driving rod is fixed to a coupling member 346 coupled to the plate member 313 of the receptor unit 310 across the second plate unit 341b.

Thus, the receptor unit 310 is configured to be capable of reciprocating in the z axis direction via the second linear guide Gz by extending and contracting the driving rod of the second driving cylinder 342z. Although not shown, there is provided a stopper that specifies a maximum extended position of the driving rod. The maximum extended position of the driving rod determines a z position where the receptor unit 310 accepts the optical disc Ds.

(Driving Unit)

The driving unit 33 is configured to be capable of moving the gripping unit 320 to the y axis direction. The driving unit 33 includes a movable member 331 that supports the driving source 324 of the gripping unit 320, a guide block 332 that supports the movable member 331 via a third linear guide Gy extending in parallel to the y axis direction, and a third driving cylinder 333 that can move the movable member 331 relatively to the guide block 332 in the y axis direction.

The guide block 332 is integrally fixed to base unit 30, and the movable member 331 is attached to an upper surface thereof via the linear guide Gy. The third driving cylinder 333 has a driving rod 333a that extends and contracts in y axis direction (see FIG. 21B), and a distal end of the driving rod 333a is fixed to the movable member 331.

The guide block 332 is configured of a substantially rectangle metal plate having long sides in the y direction. To one end, a fixture 334 that fixes the third driving cylinder 333 is attached, and at the other end, a stopper 335 that specifies a maximum extended position of the driving rod of the third driving cylinder 333 by being in contact with the movable member 331.

The driving unit 33 is configured to be capable of reciprocating straightly the gripping unit 320 between a first position and a second position. The first position is where the optical disc Ds is delivered between the driving unit 33 and the transfer robot 200, and the second position is where the optical disc Ds is delivered between the driving unit 33 and the electronic device W of the rotary table unit 110.

Figure 21:
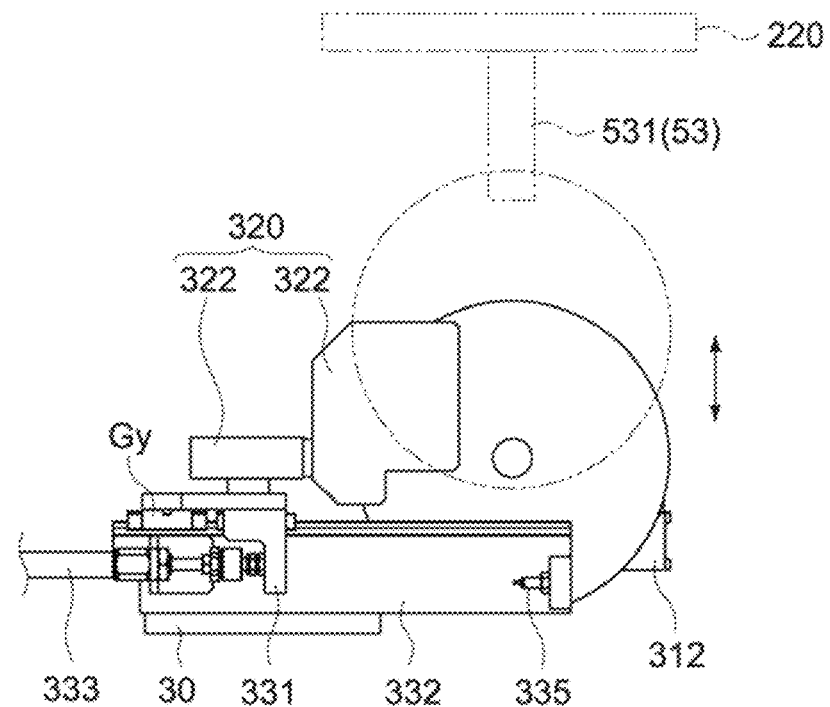
FIG. 21A is a side view of the gripping unit at a first position.
FIG. 21B is a side view of the gripping unit at a second position.
Figure 21:
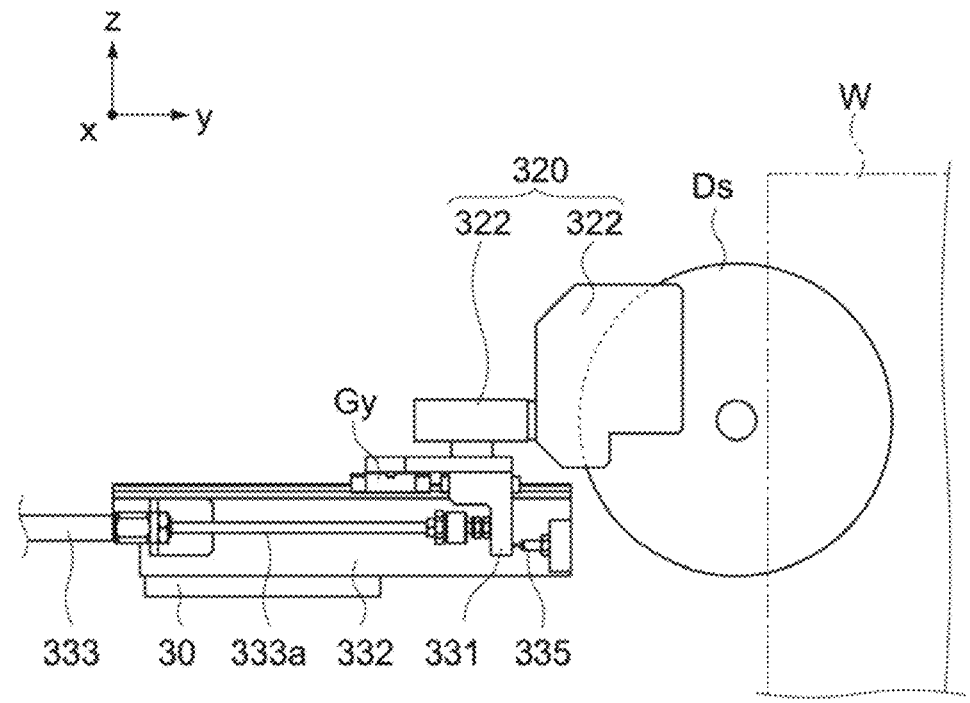

FIGS. 21A, B are side views showing that the gripping unit 320 is moved to the first position and the second position.

The gripping unit 320 delivers the optical disc Ds between the gripping unit 320 and the transfer robot 200 (hand unit 220) at the first position shown in FIG. 21A. The first position corresponds to the position where the driving rod 333a of the third driving cylinder 333 is most contracted. Also, the gripping unit 320 delivers the optical disc Ds between the gripping unit 320 and a disc insert of the electronic device W at the second position shown in FIG. 21B. The second position corresponds to the position where the driving rod 333a of the third driving cylinder 333 is most extended.

When the gripping unit 320 is reciprocated, the receptor unit 310 is moved to a predetermined retracted position by the movement mechanism 34.

Figure 22:
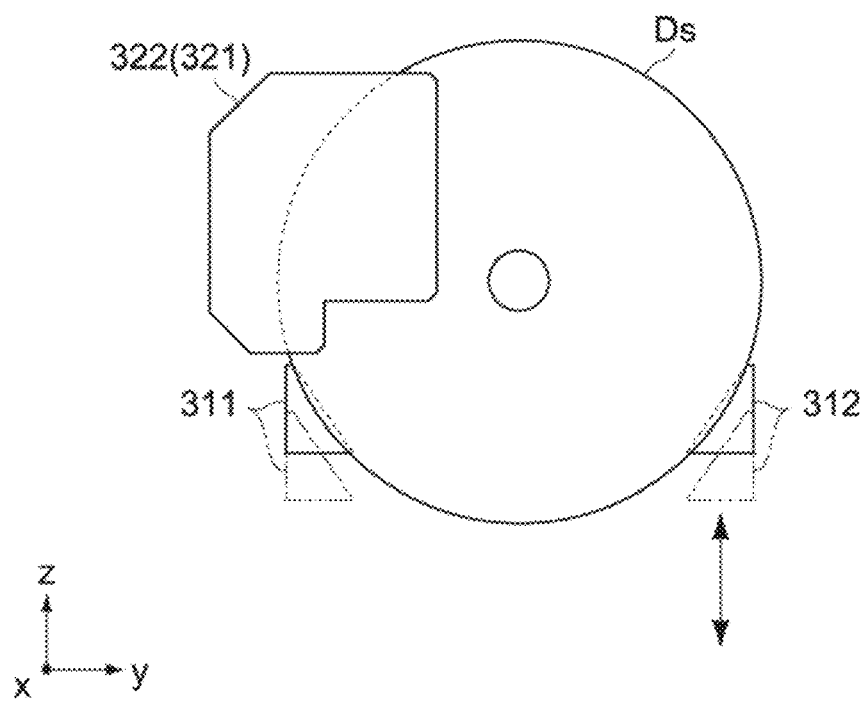
FIG. 22 is a principal side view of the mounting unit for describing an operation of the receptor unit.

As a retraction procedure, the receptor unit 310 is moved for a predetermined distance downward of the optical disc Ds along the z axis direction shown in FIG. 22 by driving the second driving cylinder 342z. This cancels the function for positioning the optical disc Ds by the support pieces 311, 312.

Next, the receptor unit 310 is moved for a predetermined distance toward a rear side of FIG. 22 along the x axis direction by driving the first driving cylinder 342x (FIG. 18). This retracts the receptor unit 310 at the position that does not inhibit the movement of the gripping unit 320 (optical disc Ds).

When the gripping unit 320 delivers the optical disc Ds between the gripping unit 320 and the hand unit 220 at the first position, the receptor unit 310 returns to the initial position for positioning the optical disc Ds by the reverse procedure.

The first to third driving cylinders 342x, 342z, 333 and the driving source 324 of the gripping unit 32 are typically configured of an air cylinder, which is not limited thereto, and may be configured of other actuators such as an oil hydraulic cylinder. Driving of the first to third driving cylinders 342x, 342z, 333 and the driving source 324 are controlled on the basis of a control command sent from the controller 90. The controller 90 executes a program stored in a memory of the controller to operate the first to third driving cylinders 342x, 342z, 333 and the driving source 324 (i.e., mounting unit 300) in a predetermined sequence.

The mounting unit 300 configured as above configures the transfer apparatus that transfers the electronic device W to the optical disc Ds in cooperation with the transfer robot 200.

Also, as described above, the mounting unit 300 in this embodiment configures the gripping apparatus that grip the optical disc Ds in a predetermined posture.

The grip mechanism includes a positioning mechanism, a gripping mechanism, and a driving mechanism.

The positioning mechanism is configured to position a disc-shaped recording medium (optical disc Ds).

The grip mechanism is configured to grip the disc-shaped recording medium positioned by the positioning unit.

The driving mechanism is configured to transfer the disc-shaped recording medium gripped by the gripping unit to the disc insert of the electronic device W.

(Action Example of Mounting Unit)

Then, a transfer action example of optical disc Ds by the transfer robot 200 and the mounting unit 300 and the operation and effect thereof will be described.

The electronic device W is disposed on the work table 100 (rotary table unit 110) with the disc insert being toward the mounting unit 300. The mounting unit 300 waits the gripping unit 320 at the first position shown in FIG. 21(A) and FIG. 21(B), and the receptor unit 310 at the disc positioning position. Furthermore, the mounting unit 300 waits the gripping unit 320 with an unclamped state.

The transfer robot 200 reverses the hand unit 220 with the third clamp unit 53 facing down. Then, the transfer robot 200 clamps a predetermined one optical disc Ds within a disc stocker M, and transfers it toward the mounting unit 300. The transfer robot 200 stops the hand unit positioned directly above of the mounting unit 300, and feeds the optical disc Ds clamped at the clamp unit 531 to the support 31 of the mounting unit 300.

In this embodiment, the hand unit 220 faces the optical disc Ds to the support 31 at the position directly above it, and then lower the optical disc Ds at a predetermined distance with a recording surface of the optical disc Ds toward a clamp piece 321 side. The predetermined distance is from the stop position of the hand unit 220 to the distance where at least a part of the optical disc Ds is positioned between the pair of clamps 321, 322 of the gripping unit 320, as shown in FIG. 21(A) and FIG. 21(B). After lowering of the hand unit 220 is stopped, a clamp action of the optical disc Ds by the clamp unit 531 is canceled. In this way, the optical disc Ds is received on the support pieces 311, 312 of the receptor unit 310 by free fall.

Once the optical disc Ds is fed to the mounting unit 300, the optical disc Ds is held at the predetermined stand posture by the positional operation by the support pieces 311, 312. Then, the mounting unit 300 grips by the gripping unit 320 the optical disc Ds received by the receptor unit 310. At this time, the plurality of protrusions 323*a* to 323*d* on the pad unit 323 disposed at the clamp piece 321 on one side are in contact with the information non-recorded regions Sa, Sb on the recording surface of the optical disc Ds, as shown in FIG. 20. In this way, an information recording region of the optical disc Ds is protected, whereby the adequate functional evaluation of the electronic device W is ensured, and one optical disc Ds can be used for a plurality of the electronic device W for a long time.

After the mounting unit 300 clamps the optical disc Ds by the gripping unit 320, the receptor unit 310 is moved to the retracted position by the movement mechanism 34. This action is that, as described above, after the receptor unit 310 is moved vertically downward for a predetermined distance, as shown in FIG. 22, the receptor unit 310 is moved to the x axis direction, as shown in FIG. 18 by a solid line. This allows the receptor unit 310 to be moved to the predetermined retracted position without damaging a periphery of the optical disc Ds.

Next, the mounting unit 300 moves straightly the gripping unit 320 by the driving unit 33 from the first position shown in FIG. 21A to the second position shown in FIG. 21B. This allows the optical disc Ds to be transferred to the disc insert of the electronic device W.

The second position of the gripping unit 320 is where a part of the optical disc Ds is inserted into the disc insert of the electronic device W, and where loading of the optical disc Ds is started by a loading mechanism within the electronic device W. Accordingly, when the gripping unit 320 reaches the second position, the mounting unit 300 cancels the clamp force by the gripping unit 320. In this manner, without inhibiting a loading action of the optical disc Ds by the electronic device W, the optical disc Ds can be inserted into the electronic device W adequately. Thereafter, the mounting unit 300 waits the gripping unit 320 at the second position as it is.

When the functional evaluation of the electronic device W using the optical disc Ds is completed, the electronic device W executes an unloading action of the optical disc Ds. The mounting unit 300 waits the gripping unit 320 at the second position, and clamps the optical disc Ds ejected from the disc insert by the gripping unit 320. Then, the mounting unit 300 returns the gripping unit 320 to the first position by the driving unit 33, moves the receptor unit 310 to the positioning position in a procedure opposite to the above by the movement mechanism 34, and cancels the clamp action of the optical disc Ds by the gripping unit 320. In this manner, the optical disc Ds is held at the predetermined stand posture on the receptor unit 310 (support pieces 311, 312).

Thereafter, the transfer robot 200 moves the hand unit 220 directly above the optical disc Ds within the mounting unit 300. Then, the optical disc Ds is taken out via the clamp unit 531 by an up and down action of the hand unit 220.

In this embodiment, the hand unit 220 includes a pair of clamp units 531 as the third clamp unit 53. Accordingly, when other optical disc for inspection is clamped to one clamp unit 531 in advance, the optical disc Ds used for the former inspection by the other clamp unit 531 is taken out, and a relative position of the hand unit 220 to the mounting unit 300 is adjusted. By repeating the predetermined up and down actions, the other optical disc Ds for inspection can be fed into the mounting unit 300. In this manner, as a transfer time of the optical disc is shortened, it is possible to decrease the cycle time necessary for the functional evaluation of the electronic device W using the plurality of optical discs Ds.

As described above, the transfer action of the optical disc Ds to the electronic device W by the transfer robot 200 and the mounting unit 300 is performed. The above-described actions are separately executed by the plurality of mounting unit 300 on the work table 100.

According to this embodiment, it is possible to ensure appropriate insertion of the optical disc Ds into the electronic device while protecting the optical disc, and to improve a transfer processing capability as compared with the case that an optical disc accommodated in a disc stocker by one robot is inserted into the electronic device.

That is to say, when hands attached to distal ends of a robot are used to insert an optical disc directly to an electronic device, a transfer position accuracy, a transfer speed, and a processing capability of the optical disc by the robot will become problems.

For example, the disc insert is formed as narrow as the thickness of the optical disc. Therefore, if the insert position accuracy is low, the optical disc may be in contact with a periphery of the disc insert. If the insert speed is high, the optical disc and the electronic device are increasingly damaged. Also, if the insert speed is high, a loading mechanism of the electronic device is likely to be damaged. Furthermore, as the robot has to hold the optical disc until the loading is started, the cycle time is prolonged. When there are a plurality of electronic devices, the problems becomes more prominent.

In contrast, the inspection apparatus 10 according to this embodiment is configured such that the insertion of the optical disc Ds into the electronic device W is shared by the transfer robot 200 and the mounting unit 300. In this manner, it is possible to ensure adequate insertion of the optical disc Ds into the electronic device W, and to shorten the cycle time. The operation and effect becomes especially prominent when the plurality of mounting units are disposed corresponding to the plurality of devices on the work table.

More specifically, according to this embodiment, while one mounting unit 300 inserts the optical disc Ds into one electronic device, the transfer robot 200 can transfer the optical disc used for inspection of the other electronic device by the other mounting unit, or transfer another electronic device between the transfer line 20 and the work table 100. Parallelization of the operation will be possible, whereby the cycle time can be shortened, and a processing ability can be drastically improved.

In addition, according to this embodiment, the optical disc Ds is transferred from the transfer robot 200 to the mounting unit 300 by using a free fall of the optical disc Ds from a predetermined position. Therefore, the time taken to transfer the optical disc between them is shortened, thereby further shortening the cycle time.

According to this embodiment, as optical disc Ds is positioned at a predetermined posture in the mounting unit 300, a deviation of the clamp position of the optical disc Ds by the gripping unit 320 is prevented, and an appropriate insertion posture and an insertion position accuracy of the optical disc Ds can be ensured. This prevents collision of the optical disc Ds against the electronic device W, and protects both of the optical disc Ds and the electronic device W.

Furthermore, according to this embodiment, as information non-recording regions Sa, Sb on a recording surface of the optical disc Ds is gripped by the gripping unit 320, the recording surface of the optical disc Ds can be protected. As both surfaces of the optical disc Ds are clamped, a stable clamp operation to the optical disc Ds is ensured.

In order to avoid the clamp of the recording regions, both surfaces of the disc periphery may be clamped, or a plurality of points of the disc periphery may be clamped in its radial direction. However, in the former case, a transfer posture of the disc becomes unstable, and in the latter case, the appropriate disc insertion into the disc insert becomes difficult. According to this embodiment, without raising the problems, the optical disc can be inserted into the electronic device stably and appropriately.

According to this embodiment, as the mounting unit 300 is configured such that the optical disc Ds is transferred straightly toward the electronic device W, it is possible to simplify the structure and improve the transfer accuracy.

In particular, as the receptor unit 310 and the movement mechanism 34 are separated, and only the gripping unit 320 is transferred, the object to be transferred can be weight-saved. This decrease a counteraction upon the disc transfer in each mounting unit 300, which inhibits vibration from generating on the work table 100. Accordingly, an adverse effect on the other mounting unit 300 by the vibration can be avoided.

As a relative distance between the mounting unit 300 and the electronic device W can be shortened, the work table 100 is inhibited from enlarging, and the inspection apparatus 10 can be small-sized.

[Work Table]

Then, the work table 100 will be described in detail.

Figure 23:
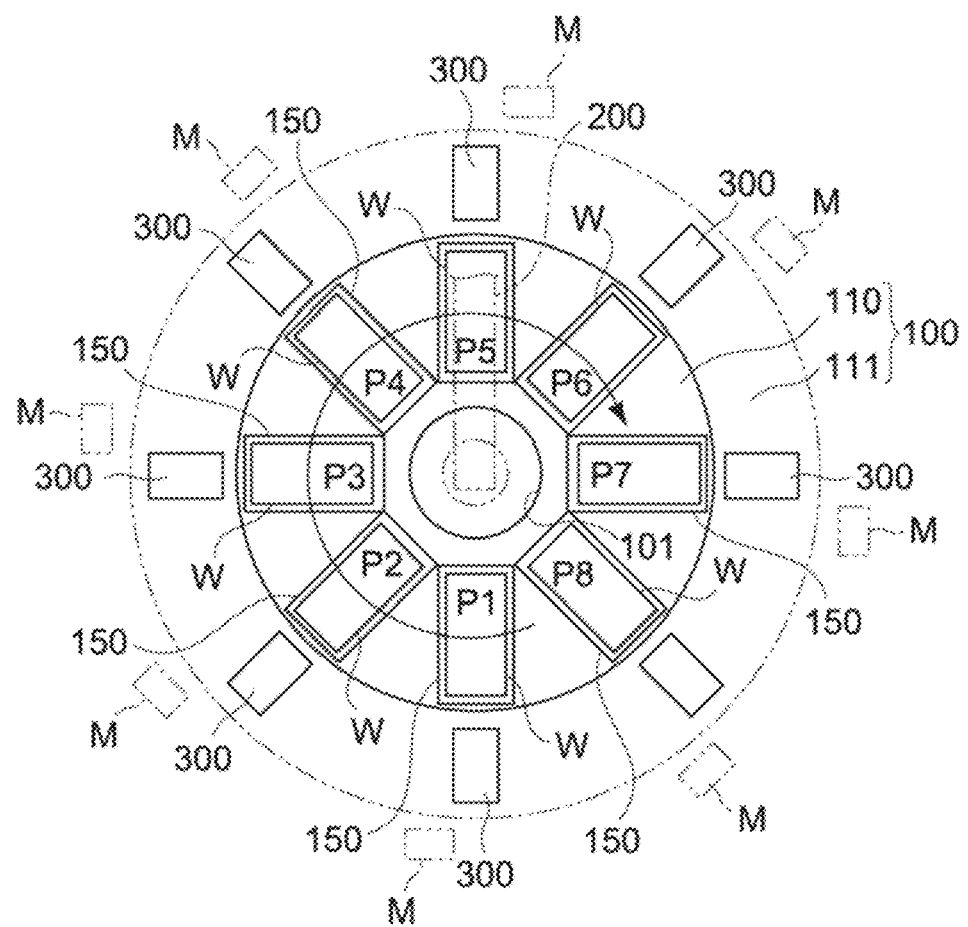
FIG. 23 is a schematic plan view of a work table in the inspection apparatus.

FIG. 23 is a schematic plan view of the work table 100.

The work table 100 includes a rotary table unit 110 and a fixed table unit 111.

The rotary table unit 110 is configured of an index table that can rotate intermittently around the Z axis (FIG. 1) in-plane at a predetermined angle pitch. In this embodiment, eight electronic devices W are disposed on the rotary table unit 110 at equal angle spaces (45 degrees space). For this, the rotary table unit 110 is configured to rotate in a fixed direction (for example, clockwise direction in FIG. 23) at a 45 degrees pitch.

On the other hand, the plurality of mounting units 300 are disposed on the fixed table unit 111 at equal angle spaces. In this embodiment, eight mounting units 300 are disposed at 45 degrees spaces so as to face to the respective electronic devices W.

At the center of the rotary table unit 110, the opening 101 through which the transfer robot 200 is disposed is provided. The transfer robot 200 is disposed in no contact with the work table 100 (the opening 101), thereby preventing the vibration from generating on the work table 100 by being in contact with the transfer robot 200.

The rotary table unit 110 rotates at 45 degrees pitch for every predetermined time. The predetermined time is set to perform the predetermined processing in each rotation position of the rotary table unit 110 including an inspection station and a carry in/out station of the electronic device. Typically, the predetermined time is set to the longest time necessary for the processing of the respective stations.

Figure 24:
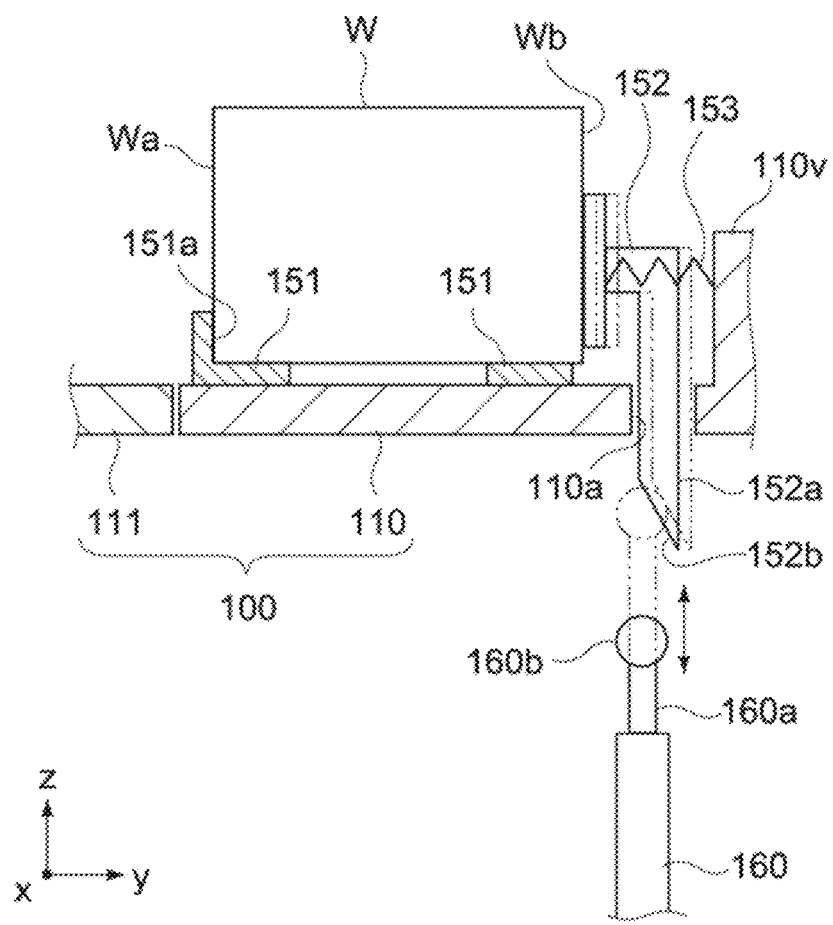
FIG. 24 is a principal cross-sectional view of the work table.

On the rotary table unit 110, a plurality of cradles 150 that can support the electronic devices W are placed at equal angle spaces. FIG. 24 is a principal cross-sectional view of the work table 100 showing the configuration of the cradle 150. The cradle 150 includes a pedestal unit 151 for supporting the electronic device W, and a pusher 152 for positioning the electronic device W on the pedestal unit 151.

The electronic device W is placed on the pedestal unit 151 at a stand posture that a front Wa where the disc insertion is formed faces to the mounting unit 300. The pedestal unit 151 includes a reference surface 151a that is capable of being partly contact with the front Wa of the electronic device W. The pusher 152 is configured to press the electronic device W toward the reference surface 151a when an urging force of the spring 153 disposed between a wall 110v integrally formed on the upper surface of the rotary table unit 110 and the pusher 152 is applied. This allows the electronic device W to be disposed with a high positioning accuracy against the rotary table unit 110.

The electronic device W is attached/detached to/from the cradle 150 at a predetermined rotation position (the carry in/out station of the electronic device) of the rotary table unit 110. At the rotation position, a cancellation cylinder 160 is disposed just under the pusher 152, as shown in FIG. 24. The pusher 152 has an axis unit 152a that penetrates a hole 110a formed on the rotary table unit 110. A distal end 152b of the axis unit 152a faces to a distal end 160b of a driving rod 160a of the cancellation cylinder 160. The distal end 152b of the axis unit 152a has a tapered surface that is in contact with the distal end 160b when the driving rod 160a is elevated, and resists the urging force of the spring 153 generated by pushing-up of the distal end 160b to move the pusher 152 to a retracted position shown by a long dashed double-short dashed line in FIG. 24.

As described above, by driving the cancellation cylinder 160, the positioning operation of the electronic device W by the pusher 152 is canceled, and the electronic device W can be detached from the possible cradle 150. Also, by driving the cancellation cylinder 160, the pusher 152 is retracted back to a non-positioning position, whereby the electronic device W can be transferred to the cradle 150.

Although not shown, each cradle 150 has not only the positioning function of the electronic device W along the y axis direction in FIG. 24, but also the positioning function of the electronic device W along the x axis direction. In this case, the pedestal unit 151 has the reference surface formed to face the electronic device W in the x axis direction, and the cradle 150 further includes a pusher that presses the electronic device W to the reference surface.

Furthermore, although not shown, each cradle 150 includes a cable unit for inserting and extracting cables including a power source cable, a signal cable, etc. into/from the electronic device W placed on the pedestal unit 151. The cable unit is disposed at the carry in/out station of the electronic device, and the cables are connected to the controller 90 and the power source.

[Action of Inspection Apparatus]

The inspection apparatus 10 executes a predetermined functional evaluation and a carry in/out action of the electronic device W at each rotation position while the rotary table unit 110 of the work table 100 is rotated at the equal angle pitch for every predetermined time. The action of the inspection apparatus 10 is controlled by the controller 90.

As shown in FIG. 23, the inspection apparatus 10 includes a plurality of inspection stations P1 to P8. A First inspection station P1 also functions as a carry-in station of the electronic device W. The transfer robot 200 transfers the electronic device W from the transfer line 20 to the first inspection station P1.

At this time, as described above, the stransfer robot 200 clamps the electronic device W by the first and second clamp units 51, 52, converts it into the predetermined stand posture where the front surface Wa faces to the mounting unit 300, and places it on the cradle 150 of the first inspection station P1. After the electronic device W is placed on the pedestal unit 151 of the cradle 150, the cancellation cylinder 160 is canceled, and the electronic device W is positioned by the pusher 152 (FIG. 24).

The electronic device W is transferred to the first inspection station P1, and various cables are connected to the electronic device W, thereby starting up the electronic device W. Thereafter, the transfer robot 200 picks up the optical disc Ds for the predetermined inspection from the disc stocker M of the first inspection station P1 via the third clamp unit 53, and the optical disc Ds is transferred to the mounting unit 330 of the first inspection station P1. The mounting unit 300 that receives the optical disc Ds inserts the optical disc Ds into the disc insert of the electronic device W by the above-described action. Then, a first functional evaluation is performed using the optical disc Ds.

Once the first functional evaluation of the electronic device W at the first inspection station P1 is completed, the optical disc Ds is ejected from the electronic device W, and the optical disc Ds is taken out by the mounting unit 300. Thereafter, the optical disc Ds is returned from mounting unit 300 to the disc stocker M by the transfer robot 200.

Then, the electronic device W is transferred from the first inspection station P1 to the adjacent second inspection station P2 by the rotation of the rotary table unit 110. At this time, the mounting unit 300 in the second inspection station P2 accommodates the optical disc Ds transferred by the transfer robot 200 for performing a second functional evaluation. Then, the optical disc Ds is inserted into the electronic device W by the mounting unit 300, and the second functional evaluation is started.

While the functional evaluation of the electronic device W is performed at the second inspection station P2, other electronic device W is transferred from the transfer line 20 to the first inspection station P1 by the transfer robot 200, and the similar processing described above (positioning, start-up, the first functional evaluation, etc. of the electronic device) is performed on the other electronic device W.

After the second functional evaluation of the electronic device W is completed and the optical disc Ds is taken out by the mounting unit 300, the rotation action of the rotary table unit 110 is re-started, the electronic device W is transferred from the second inspection station P2 to the third inspection station P3, and a third functional evaluation is performed on the electronic device W. At the same time, the second functional evaluation of other electronic device W placed on the first inspection station P1 is performed at the second inspection station.

Typically, the inspection apparatus 10 executes repeatedly the above-described action to transfer sequentially the electronic device W from the first inspection station P1 to the eighth inspection station P8, and to perform the predetermined numbers of the functional evaluation. The eighth inspection station P8 functions also as the carry-out station of the electronic device W. After the final functional evaluation of the electronic device W is completed at the eighth inspection station P8, the positioning mechanism in the cradle 150 is released, and various cables are pulled out. Thereafter, the electronic device W is carried-out from the inspection apparatus 10 to a predetermined carrying-out destination by the transfer robot 200.

As above, various functional evaluations of the electronic device W are performed by the inspection apparatus 10. The controller 90 controls driving of the work table 100, the transfer robot 200, the mounting unit 300, etc., thereby operating the whole apparatus by a predetermined cycle time.

In general, when a number of inspections are performed by one inspection apparatus at the same time, the cycle time of the apparatus depends on the cycle time of the inspection process taking the longest time. No matter how the time for the other inspection processes is short, the cycle time of the whole apparatus cannot be shorter than the cycle time of the inspection process taking the longest time.

Figure 25:
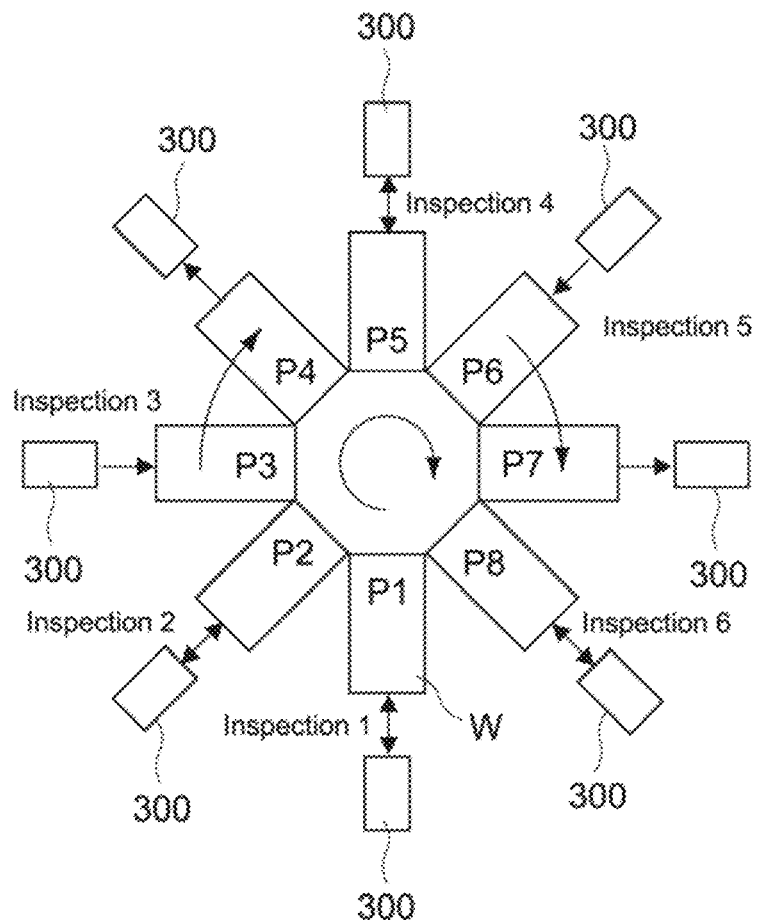
FIG. 25 is a view for describing an operation of the inspection apparatus.

Then, in this embodiment, the above-described problems are solved by as follows:

FIG. 25 is a view for describing an example method of inspecting the inspection apparatus 10 in this embodiment. In the example shown, first to sixth functional evaluations (inspection 1 to inspection 6) are performed on the electronic device W. Arrows shown in the respective inspection stations P1 to P6 show the transfer directions of the optical discs Ds used in the respective functional evaluations.

Here, it illustrates that inspection times for the first, second, fourth and sixth functional evaluations are shorter than an interval period (rotation stop period) of the rotary table unit 110, and inspection times for the third and fifth functional evaluations are longer than an inverted period of the rotary table unit 110.

As shown in FIG. 25, the electronic device W is carried in to the first inspection station P1, and is then performed for the first functional evaluation (inspection 1). Then, the electronic device W is then performed for the second functional evaluation (inspection 2) at the second inspection station P2. Then, the electronic device W is performed for the third functional evaluation (inspection 3) at the third inspection station P3 and the fourth inspection station P4.

In the third functional evaluation, the optical disc Ds necessary for the third functional evaluation in the third inspection station P3 is inserted into the electronic device W via the mounting unit 300. The third functional evaluation needs the time longer than the interval period of the rotary table unit 110. Accordingly, in this embodiment, the third functional evaluation is performed across the third inspection station P3 and the fourth inspection station P4.

Although the third functional evaluation is also performed during the rotation of the rotary table unit 110, a part (for example, reading out of information from the optical disc Ds) of the inspection may be interrupted during the rotation depending on the magnitude of the rotation acceleration of the rotary table unit 110. In this embodiment, by limiting the rotation acceleration of the rotary table unit 110 to the predetermined value or less, the functional evaluation is possible during the rotation, thereby decreasing the cycle time.

After the third functional evaluation is completed, the optical disc Ds used for the third functional evaluation is ejected to the mounting unit 300 at the fourth inspection station P4, and is returned to the disc stocker M from the mounting unit 300 to the third inspection station P3 by the transfer robot 200.

Then, the electronic device W is performed for the fourth functional evaluation (inspection 4) at the fifth inspection station, and for the fifth functional evaluation (inspection 5) at the sixth and seventh inspection stations P6, P7 by the procedure similar to the above-described third functional evaluation process. After the electronic device W is performed for the sixth functional evaluation (inspection 6) at the eighth inspection station P8, the electronic device W is transferred outside of the inspection apparatus 10 by the transfer robot 200.

In this embodiment, the inspection process that needs a long cycle time is performed across a plurality of inspection stations mutually adjacent. Thus, the cycle time of the whole apparatus does not depend on the cycle time of the inspection process taking the longest time. In this manner, a part of the inspection process having the long cycle time is performed at other station(s) by transferring with the inspection being continued. The inspection time at each inspection station is homogenized. As a result, the cycle time of the whole apparatus is shortened. According to this embodiment, the cycle time can be shortened, a processing capability of the inspection apparatus 10 can be improved.

Also, according to this embodiment, as the transfer robot 200 is disposed within the opening 101 formed at the center of the rotary table unit 110, the transfer robot 200 is positioned at equal distances to the respective inspection stations P1 to P8. This allows a tact time necessary for the transfer of the optical disc Ds at the inspection stations to be homogenized, and the whole apparatus to be small-sized.

In addition, as the transfer robot 200 includes the hand unit 220 that can clamp the electronic device W and the optical disc Ds, the electronic device W and the optical disc Ds can be transferred by one transfer robot 200, thereby decreasing the numbers of the robots.

In the example shown in FIG. 25, the single functional evaluation is performed in the inspection station P1, P2, P5, or P8. However, it is not limited thereto, and two or more functional evaluations may be performed. Similarly, in the inspection station P3, P4, P6 or P7, other functional evaluation may be performed before or after the functional evaluation across the stations.

While the embodiments of the present technology are described, it should be appreciated that the present technology is not limited thereto and variations and modifications may be made without departing from the scope of the present technology.

For example, in the above embodiments, the inspection apparatus for inspecting the electrical action of the electronic device is illustrated as the industrial robot. Alternatively, it is also applicable to other industrial robot including an assembly unit or a welding unit. In this case, the mounting unit is configured, for example, such that assembly parts or a welding rods are transferred to a predetermined position of the electronic device as the work.

Also, in the above embodiments, the transfer robot 200 for transferring the work is disposed at the first stand 41, and the mounting unit 300 and the work table 100 for supporting the electronic device W are disposed at the second stand 42, but it is not limited thereto. For example, even if other apparatuses that are vibration sources are disposed at the first and second stands, a vibration transmission (cross talk) between the both stands is inhibited, thereby performing an independent work requiring accuracy in the both stands.

In the above embodiments, the second stand 42 is disposed surrounding the first stand 41, but layouts of the both stands are not especially limited. The numbers of the stands are also not limited to two, and the present technology is applicable to a variety of stand structures where three or more stands are coupled via coupling frames.

Figure 26:
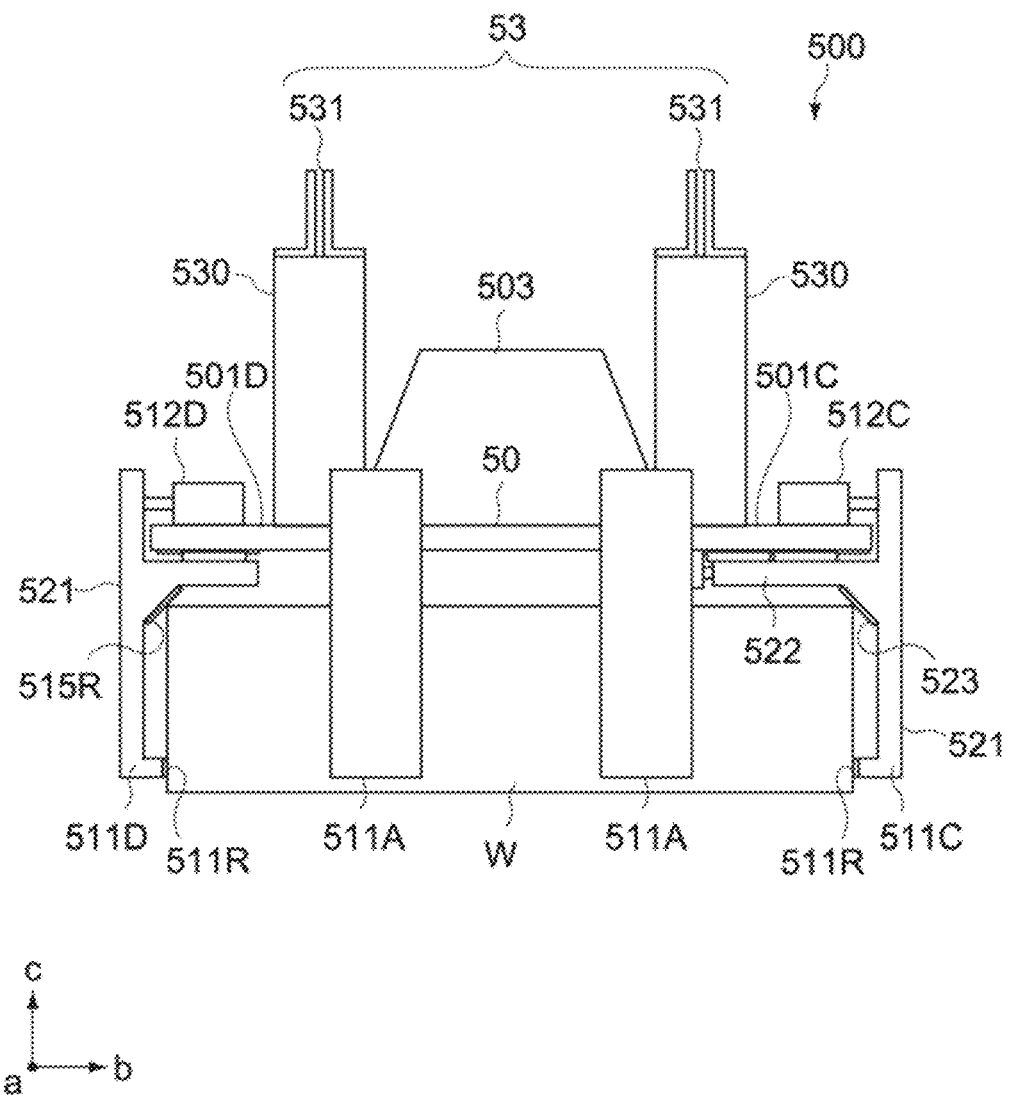
FIG. 26 is a front view showing an alternative embodiment of a configuration of the clamp apparatus.

Furthermore, the shapes of the claw units 511A to 511C of the clamp apparatus 500 are not limited to the above embodiments. For example, as shown in FIG. 26, the distal ends of the claw units may be bent to an electronic device W side. In this case, a slope 523 may be provided between the vertical plate unit 521 and the horizontal plate unit 522 of the claw unit, and a protection layer 515R similar to the protection layer 511R may be attached to the surface of the slope 523. Thus, as a height position of the electronic device W can be regulated, a clamp position accuracy of the electronic device W in the tree axis directions can be improved.

The embodiment is not limited to the case that the electronic device W and the optical disc Ds are transferred by the common transfer robot 200, and the electronic device W and the optical disc Ds may be transferred by separate transfer robots.

In the above embodiments, the inspection apparatus 10 is configured such that the electronic device is transferred at a predetermined angle pitch using the rotary index table, but it is not limited thereto. It may be configured such that the electronic device is sequentially transferred to each inspection station using a transfer mechanism that can transfer straightly the electronic device at a predetermined pitch.

Furthermore, it is not limited to the case that the plurality of mounting units are disposed on the work table, and at least one mounting unit may be disposed. In this case, the inspection apparatus may be configured to sequentially transfer the electronic device to a plurality of work tables each having a single mounting unit using a transfer robot.

The present technology may have the following configurations.

(1) A transfer apparatus, including:
a work table that supports at least one electronic device;
a transfer robot that transfers a work to be mounted to the electronic device; and at least one mounting unit including a support that supports the work transferred by the transfer robot, and a driving unit that transfers the support toward the electronic device on the work table.

(2) The transfer apparatus according to (1), in which
the support includes
a receptor unit that is capable of receiving the work transferred by the transfer robot, and
a gripping unit that is capable of gripping the work received by the receptor unit.

(3) The transfer apparatus according to (2), in which
the receptor unit includes a positioning mechanism that positions the work at a predetermined posture.

(4) The transfer apparatus according to (3), in which
the work is a disc-shaped recording medium, and
the gripping unit grips a predetermined position on a recording surface of the disc-shaped recording medium and an opposite surface thereof.

(5) The transfer apparatus according to any one of (1) to (4), in which
the work is a recording medium that stores information that the electronic device is readable, and
the driving unit is configured to be capable of reciprocating straightly the support between a first position and a second position; the first position being where the work is delivered between the driving unit and the transfer robot, and the second position being where the work is delivered between the driving unit and the electronic device.

(6) The transfer apparatus according to any one of (1) to (5), in which
the electronic device includes a plurality of electronic devices disposed on the work table, and
the mounting unit includes a plurality of mounting units disposed corresponding to the plurality of electronic devices.

(7) The transfer apparatus according to (6), in which
the plurality of mounting units are disposed at equal angle spaces around the work table, and
the work table is configured of an index table rotatable at equal angle spaces.

(8) The transfer apparatus according to (7), in which
the transfer robot is disposed at a center part of the work table being in non-contact with the work table.

(9) The transfer apparatus according to any one of (1) to (8), in which
the transfer robot includes a hand unit including a first clamp apparatus that is capable of gripping the electronic device, and a second clamp apparatus that is capable of gripping the work.

Also, the present technology includes the following inspection method.

An inspection method, including:
transferring intermittently an object to be inspected at a predetermined pitch,
performing a first inspection of the object to be inspected at a first transfer position,
performing a second inspection of the object to be inspected at a second transfer position, and
performing continuously the second inspection at a third transfer position adjacent to the second transfer position.

Also, the present technology includes the following inspection method of an electronic device.

(1) An inspection method of an electronic device, including:
placing an electronic device on a work table that is rotatable intermittently at equal angle spaces;
performing first functional evaluation on the electronic device at a first rotation position of the work table;
starting second functional evaluation on the electronic device at a second rotation position of the work table; and
ending the second functional evaluation at a third rotation position downstream of the second rotation position.

(2) The inspection method of an electronic device according to (1), in which
performing the second functional evaluation includes
a step of inserting a recording medium necessary for the second functional evaluation into the electronic device at the second rotation position, and
drawing out the recording medium from the electronic device at the third rotation position.

(3) The inspection method of an electronic device according to (1), in which
a plurality of electronic devices are placed on the work table at equal angle spaces, and
the first functional evaluation and the second functional evaluation are performed at the same time.

Furthermore, the present technology includes the following gripping apparatus.

(1) A gripping apparatus, including:
a positioning mechanism that positions a disc-shaped recording medium;
a grip mechanism that grips the disc-shaped recording medium positioned by the positioning mechanism; and
a driving mechanism that transfers the disc-shaped recording medium gripped by the gripping unit to a disc insert of the electronic device.

(2) The gripping apparatus according to (1), in which
the grip mechanism includes a first pad unit that is capable of being in contact with a predetermined position of the disc-shaped recording medium, and
a second pad unit that is capable of being in contact with a surface opposite to the recording surface.

(3) The gripping apparatus according to (2), in which
the first pad unit includes a plurality of protrusions.

(4) The gripping apparatus according to (2) or (3), in which
the first pad unit is configured to be capable of being in contact with a region where information on the recording surface is not recorded.

REFERENCE SIGNS LIST

10 inspection apparatus
20 transfer line
31 support
33 driving unit
34 movement mechanism
41 first stand
42 second stand
43 coupling frame
50 base unit
51 first clamp unit
52 second clamp unit
53 third clamp unit
100 work table
110 rotary table unit
200 transfer robot
210 multijoint arm
300 mounting unit
310 receptor unit
311, 312 support pieces
320 gripping unit
400 stand unit
411 first base frame 412 second base frame
500 clamp apparatus
511A to 511D claw unit
511R, 515R protection layer
512A to 512D driving source
513A to 513D linear guide
514A, 514C regulating unit
Ds optical disc
W electronic device

The invention claimed is:

1. A transfer apparatus, comprising:
a work table configured to support an electronic device of a plurality of electronic devices, wherein the work table comprises:
 a rotary table unit that is rotatable, wherein the rotary table unit is configured to move the plurality of electronic devices to each of a plurality of inspection positions along a circumference of the rotary table unit; and
 a fixed table unit on an outer periphery of the rotary table unit;
a transfer robot configured to transfer a work to be mounted to the electronic device; and
a mounting unit of a plurality of mounting units configured to one of attach or detach the work to the electronic device, wherein the mounting unit comprises:
 a base on the fixed table unit, wherein the base is at a determined height from a surface of the work table;
 a support on the base, wherein the support is configured to support the work transferred by the transfer robot; and
 a driving unit on the base, wherein the driving unit is configured to transfer the support toward the electronic device on the work table, wherein the support comprises:
  a receptor unit configured to receive the work transferred by the transfer robot; and
  a gripping unit configured to grip the work received by the receptor unit.

2. The transfer apparatus according to claim 1, wherein the receptor unit includes a positioning mechanism that is configured to position the work at a specific posture.

3. The transfer apparatus according to claim 2, wherein the work is a disc-shaped recording medium, and
the gripping unit is configured to grip a specific position on a recording surface of the disc-shaped recording medium and an opposite surface of the disc-shaped recording medium.

4. The transfer apparatus according to claim 1, wherein the work is a recording medium that is configured to store information readable by the electronic device,
the driving unit is further configured to reciprocate straightly the support between a first position and a second position,
the work is delivered between the driving unit and the transfer robot at the first position, and
the work is delivered between the driving unit and the electronic device at the second position.

5. The transfer apparatus according to claim 1, wherein the plurality of electronic devices is on the work table, and
the plurality of mounting units corresponds to the plurality of electronic devices.

6. The transfer apparatus according to claim 5, wherein the plurality of mounting units is at equal angle spaces around the work table, and
the rotary table unit comprises an index table rotatable at the equal angle spaces.

7. The transfer apparatus according to claim 6, wherein the transfer robot is at a center part of the work table, and
the transfer robot is in non-contact with the work table.

8. The transfer apparatus according to claim 1, wherein the transfer robot includes a hand unit, and
the hand unit comprises:
 a first clamp apparatus configured to grip the electronic device; and
 a second clamp apparatus configured to grip the work.

9. The transfer apparatus according to claim 1, wherein the gripping unit is above the receptor unit.

* * * * *